United States Patent
Wallinger et al.

(10) Patent No.: US 12,292,771 B2
(45) Date of Patent: May 6, 2025

(54) SINGLE-WIRE INTERFACE PROTOCOL TO SYNCHRONIZE DEVICE STATES BETWEEN MULTIPLE DEVICES

(71) Applicant: Texas Instruments Incorporated, Dallas, TX (US)

(72) Inventors: Karl John Wallinger, Dallas, TX (US); Kevin William Brandon, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 201 days.

(21) Appl. No.: 18/141,258

(22) Filed: Apr. 28, 2023

(65) Prior Publication Data
US 2024/0361816 A1   Oct. 31, 2024

(51) Int. Cl.
*G06F 1/26* (2006.01)

(52) U.S. Cl.
CPC .................................. *G06F 1/26* (2013.01)

(58) Field of Classification Search
None
See application file for complete search history.

(56) References Cited

U.S. PATENT DOCUMENTS 11,054,878 B2 * 7/2021 Wang ................. G06F 1/3243
2021/0271276 A1 * 9/2021 Seok .................. G06F 1/26

OTHER PUBLICATIONS

Texas Instruments, "TPS65219 Integrated Power Management IC for ARM Cortex-A53 Processors and FPGAs," SLVSGA0, May 2022, 133 pages.
Wallinger et al., "Power Sequencing Interface," U.S. Appl. No. 17/537,997, filed Nov. 30, 2021, 37 pages.

* cited by examiner

*Primary Examiner* — Zahid Choudhury
(74) *Attorney, Agent, or Firm* — Charles F. Koch; Frank D. Cimino

(57) ABSTRACT

Example systems, apparatus, articles of manufacture, and methods are disclosed to implement a single-wire interface protocol to synchronize device states between multiple devices. Example logic circuitry disclosed herein for a first device includes transmit circuitry configured to pull a terminal of the first device to a first logic value for a first duration corresponding to a first command to be communicated via the terminal, wherein the first duration is one of a plurality of at least three possible durations corresponding respectively to a plurality of possible commands including the first command, and the plurality of possible commands is associated with device operation states synchronized between the first device and a second device coupled to the terminal. The example logic circuitry also includes receive circuitry configured to monitor the terminal.

20 Claims, 14 Drawing Sheets

| COMMAND SIGNAL DURATIONS | TX | RX |
|---|---|---|
| COMMAND 1 | 1-2 μs | <= 3 μs |
| COMMAND 2 | 5-7 μs | 4-9 μs |
| COMMAND 3 | 15-17 μs | 10-19 μs |
| COMMAND 4 | 22-25 μs | 20-28 μs |
| COMMAND 5 | 33-36 μs | 29-39 μs |
| COMMAND 6 | 44-48 μs | 40-50 μs |

FIG. 6

SINGLE-WIRE INTERFACE PROTOCOL TO SYNCHRONIZE DEVICE STATES BETWEEN MULTIPLE DEVICES

FIELD OF THE DISCLOSURE

This disclosure relates generally to semiconductor devices and, more particularly, to methods and apparatus to implement a single-wire interface protocol to synchronize device states between multiple devices.

BACKGROUND

Modern semiconductor devices, such as system-on-chip (SoC) devices, as well as modern computing devices implemented with such semiconductor devices, may have multiple power domains to be supplied, sequenced and monitored. Rather than utilizing a single power management integrated circuit (PMIC) to manage the multiple power domains, multiple PMICs may provide a flexible power management solution that can provide thermal, circuit/board layout and cost benefits over a single PMIC implementation.

SUMMARY

For methods and apparatus to implement a single-wire interface protocol to synchronize device states between multiple devices, example logic circuitry for a first device includes transmit circuitry configured to pull a terminal of the first device to a first logic value for a first duration corresponding to a first command to be communicated via the terminal, wherein the first duration is one of a plurality of at least three possible durations corresponding respectively to a plurality of possible commands including the first command, and the plurality of possible commands is associated with device operation states synchronized between the first device and a second device coupled to the terminal. The example logic circuitry also includes receive circuitry configured to monitor the terminal.

For methods and apparatus to implement a single-wire interface protocol to synchronize device states between multiple devices, an example power management integrated circuit a synchronization terminal to couple to a single wire interface, the single wire interface configured to couple to synchronization terminals of one or more other power management integrated circuits, and operate between a first voltage and a second voltage. The example power management integrated circuit also includes state machine circuitry configured to implement a state machine to control transitions among device operation states of the power management integrated circuit, the state machine circuitry including an output configured to specify a first signal duration corresponding to a first command to be signaled on the single wire interface from the power management integrated circuit to the one or more other power management integrated circuits, wherein the first command is associated with the state machine, and an input configured to accept a second signal duration detected on the single wire interface, wherein the state machine circuitry is configured to update the state machine based on a second command corresponding to the second signal duration. The example power management integrated circuit further includes transmit circuitry configured to pull the synchronization terminal to the first voltage for the first signal duration specified by the output of the state machine circuitry, and receive circuitry configured to monitor the synchronization terminal to detect the second signal duration, the second signal duration corresponding to a time interval over which the single wire interface is pulled to the first voltage, and provide the second signal duration to the input of the state machine circuitry.

For methods and apparatus to implement a single-wire interface protocol to synchronize device states between multiple devices, an example non-transitory computer readable medium includes example computer readable instructions to cause a programmable device that is to couple to a single wire interface to at least pull the single wire interface to a low voltage for a first signal duration to communicate a first command to one or more other devices to be coupled to the single wire interface, the single wire interface to operate between the low voltage and a high voltage, the first signal duration to begin at a first time, the first signal duration to be one of a plurality of at least three possible signal durations corresponding respectively to a plurality of possible commands including the first command, the plurality of possible commands associated with a state machine to be synchronized between the programmable device and the one or more other devices. The example computer readable instructions are also to cause the programmable device to detect a second signal duration on the single wire interface, the second signal duration corresponding to a time interval over which the single wire interface is pulled to the low voltage, the second signal duration to begin at a second time, and update the state machine based on a second command corresponding to the second signal duration.

BRIEF DESCRIPTION OF THE DRAWINGS

FIG. 6 illustrates example command signal durations utilized by the example state synchronization circuitry of FIG. 4.

In general, the same reference numbers will be used throughout the drawing(s) and accompanying written description to refer to the same or like parts, elements, etc. The figures are not necessarily to scale.

DETAILED DESCRIPTION

Figure 1:
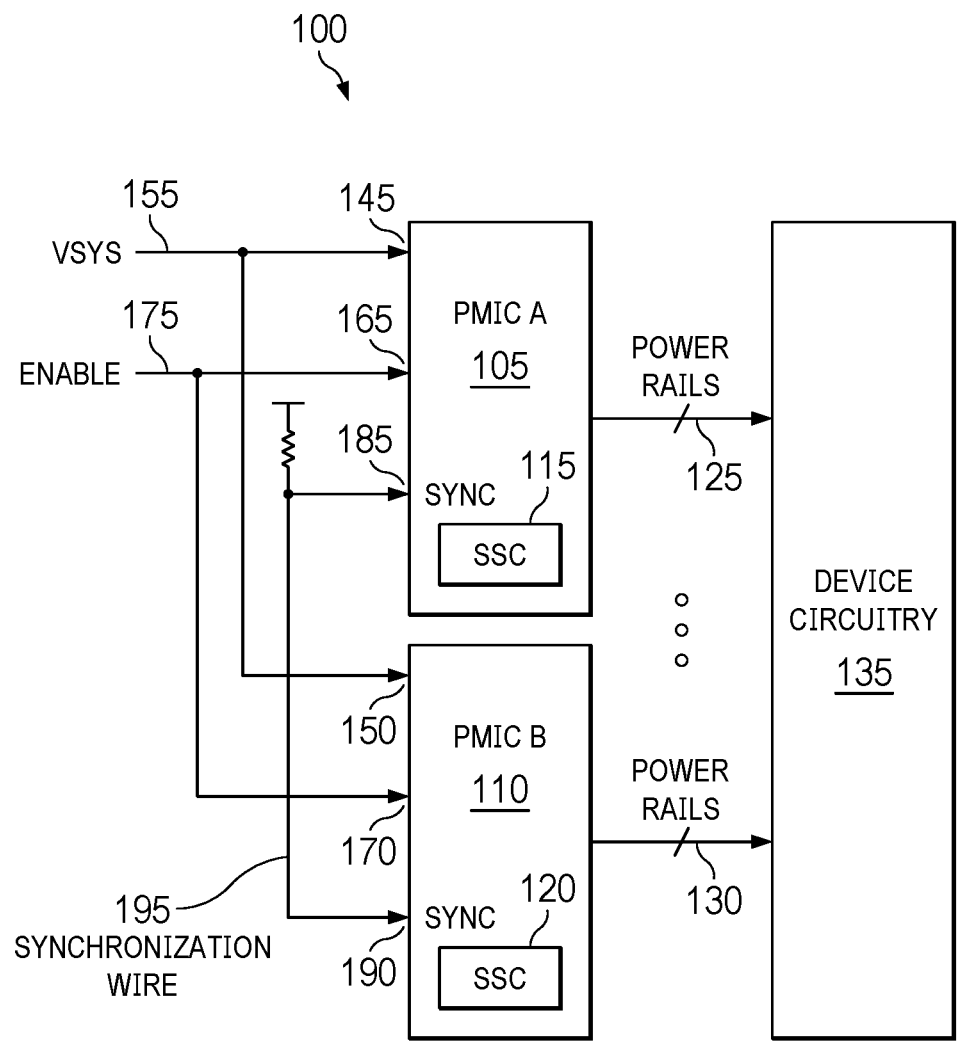
FIG. 1 is a block diagram of an example environment in which example devices include example state synchronization circuitry to implement a single-wire interface protocol to synchronize device states between the devices in accordance with teachings of this disclosure.

Example methods, apparatus, systems and articles of manufacture (e.g., physical storage media) to implement a single-wire interface protocol to synchronize device states between multiple devices are disclosed herein. As mentioned above, modern semiconductor devices and modern computing devices implemented with such semiconductor devices may have multiple power domains to be supplied, sequenced and monitored. Using a single PMIC device to manage the multiple power domains can involve a specialized implementation that presents challenges in terms of thermal, circuit/board layout, and thermal dissipation. In contrast, utilizing multiple PMIC devices can provide a scalable PMIC solution to solve, or reduce, such thermal, circuit/board layout, and/or thermal dissipation issues, but can lead to challenges associated with controlling and, more specifically, synchronizing the device states of the different PMIC devices.

For example, a power-up sequence may involve interleaved rails between the PMIC devices, requiring one PMIC device to know when another PMIC device has completed the ramp up of one or more of its rails. As another example, a fault detection in one PMIC device may require the other PMIC devices to make a common state transition to a power-down mode or other safe operating state. As yet another example, a wakeup event from low-power mode in one PMIC device may require the other PMIC devices to also wake up from low-power mode.

To overcome or at least mitigate such challenges associated with multi-device solutions, example PMIC devices disclosed herein include example state synchronization circuitry to implement a single-wire interface protocol to synchronize device states among the different devices. By utilizing a single-wire interface (also referred to as single-wire bus interface or single-wire bus), the state synchronization circuitry is able to implement a state synchronization protocol with just a single pin footprint on the overall circuit/system design, but able to support any number of protocol commands to signal any number of state transitions from any state after device initialization. In some examples, the state synchronization protocol implemented by the state synchronization circuitry also includes a heartbeat that enables bus fault detection by allowing connected PMIC devices to continually monitor the single-wire bus interface and react to or flag an error if they detect that the bus interface has not toggled after a fault time period. In some examples, the state synchronization protocol implemented by the state synchronization circuitry additionally or alternatively utilizes multiple state command groups which enables commands to be re-used, thereby reducing the maximum duration of commands and associated latencies on the single-wire bus interface.

These and other example methods, apparatus, systems and articles of manufacture (e.g., physical storage media) to implement a single-wire interface protocol to synchronize device states between multiple devices are disclosed in further detail below.

FIG. 1 is a block diagram of an example environment 100 including example PMIC devices 105-110 having example state synchronization circuitry 115-120 to implement a single-wire interface protocol to synchronize device states between the devices in accordance with teachings of this disclosure. In the illustrated example of FIG. 1, the PMIC devices 105-110 are responsible for providing and managing multiple example power rails 125-130 to implement multiple power domains for example device circuitry 135. For example, the device circuitry can be included in or implement any type of computing device, such as a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, etc., or any other type of computing and/or electronic device.

In the illustrated example, the PMIC devices 105-110 represent any type and/or number of devices capable of implementing power management functionality and having any number of device states for operation. For example, the PMIC devices 105-110 of FIG. 1 each have respective example power terminals 145-150 to couple to system power 155 (represented by VSYS in the figure), which is used by the PMIC devices 105-110 to drive their respective power rails 125-130. The PMIC devices 105-110 of FIG. 1 also each have respective example enable terminals 165-170 to couple to an example enable signal 175 that controls activation and deactivation of the PMIC devices 105-110. In the illustrated example of FIG. 1, the PMIC devices 105-110 of FIG. 1 further have respective example synchronization terminals 185-190 to couple to an example single wire synchronization interface 195 that provides the single wire interface by which the state synchronization circuitry 115-120 synchronizes the device states of the PMIC devices 105-110.

In some examples, the state synchronization circuitry 115-120 implements a single-wire open-drain protocol on the single wire synchronization interface 195, which uses low-time on the interface (e.g., durations of time that the interface is pulled to a logic low voltage level) to communicate commands and other information. For example, the state synchronization circuitry 115-120 can communicate slot-done commands associated with power-up sequences to indicate when it is time to proceed to the next power-up time slot, as well as state commands corresponding to device-level state change requests. As disclosed in further detail below, the synchronization protocol implemented by the state synchronization circuitry 115-120 over the single wire synchronization interface 195 supports any arbitrary state machine, provides diagnostics for faults on the single wire synchronization interface 195, and also uses state and command groups to minimize the bus transmission time for signaling commands.

In some examples, the synchronization protocol implemented by the state synchronization circuitry 115-120 over the single wire synchronization interface 195 enables synchronization to a common state before state transition requests and other commands are signaled on the single wire synchronization interface 195. For example, synchronization may occur on initial power-up, when the state synchronization circuitry 115-120 causes the PMIC devices 105-110 to hold the single wire synchronization interface 195 at a low voltage level (e.g., ground or some other voltage corresponding to a low logic value) until their respective initialization procedures complete. The initialization procedures may include loading internal configuration from non-volatile memory (NVM), enabling internal biases and clocks, etc. Once the initialization procedure is complete at a given PMIC device 105-110, the state synchronization circuitry 115-120 of that PMIC device 105-110 causes it to release the single wire synchronization interface 195, thereby allowing the single wire synchronization interface 195 to float up to its high voltage level (e.g., 5 volts, 3.3 volts, etc., or some other voltage corresponding to a high logic value). Once all PMIC device 105-110 release the single wire synchronization interface 195, the open-drain bus will go to its high voltage level, and the state synchronization circuitry 115-120 of the PMIC devices 105-110 will read back that high voltage level on the single wire synchronization interface 195. At this point, the state synchronization circuitry 115-120 is synchronized among the PMIC devices 105-110. After synchronization is achieved, the state synchronization circuitry 115-120 causes the PMIC devices 105-110 to send state commands on the single wire synchronization interface 195 during normal device operation. Such commands can include requests to stay in the same device state, request to move to a different device state, heartbeat commands to ensure there are no faults on the single wire synchronization interface 195, etc.

Figure 2:
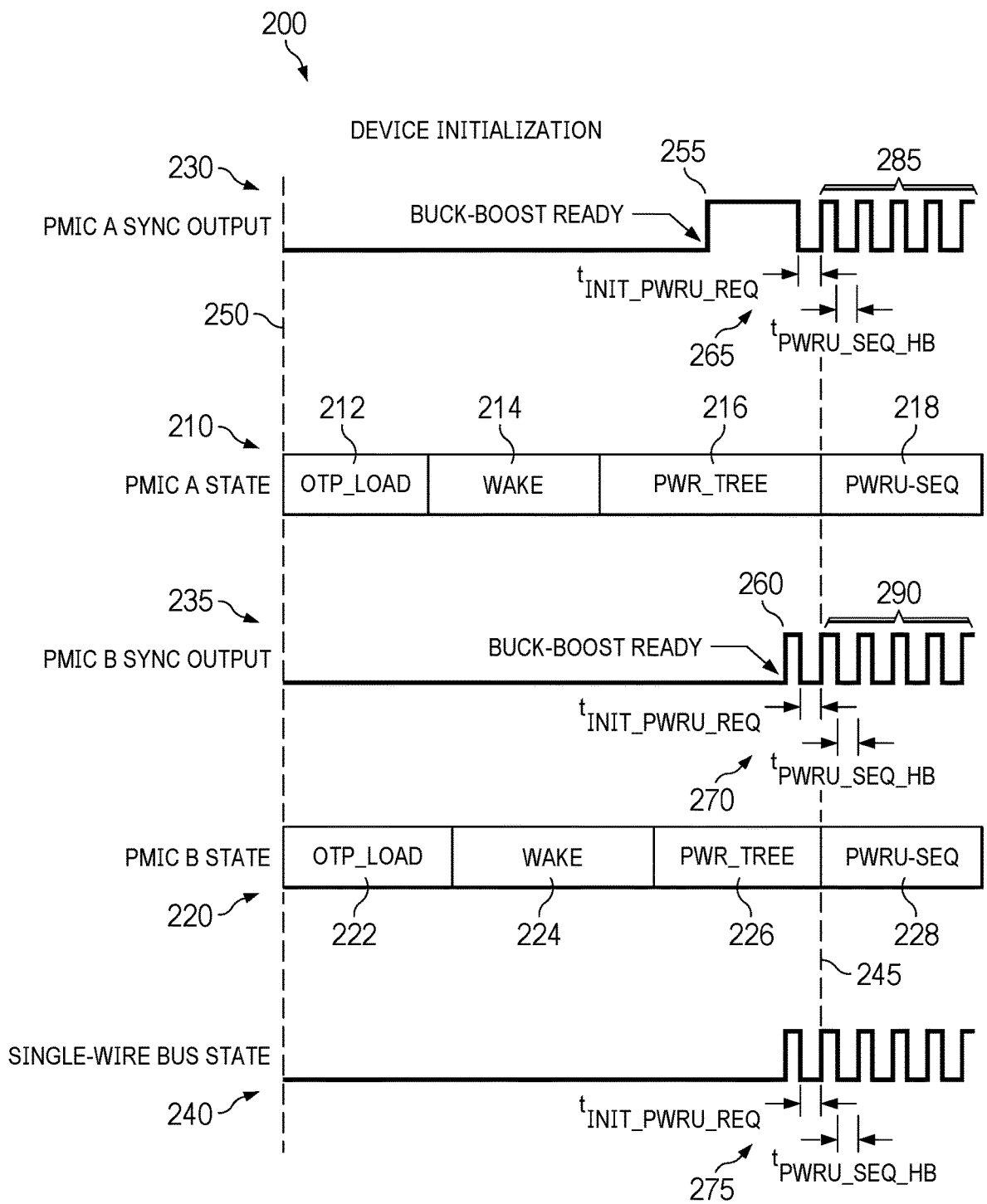
FIGS. 2 and 3 illustrate example timing diagrams that demonstrate example device initialization and device operation aspects of the single-wire interface protocol implemented in the example environment of FIG. 1.
Figure 3:
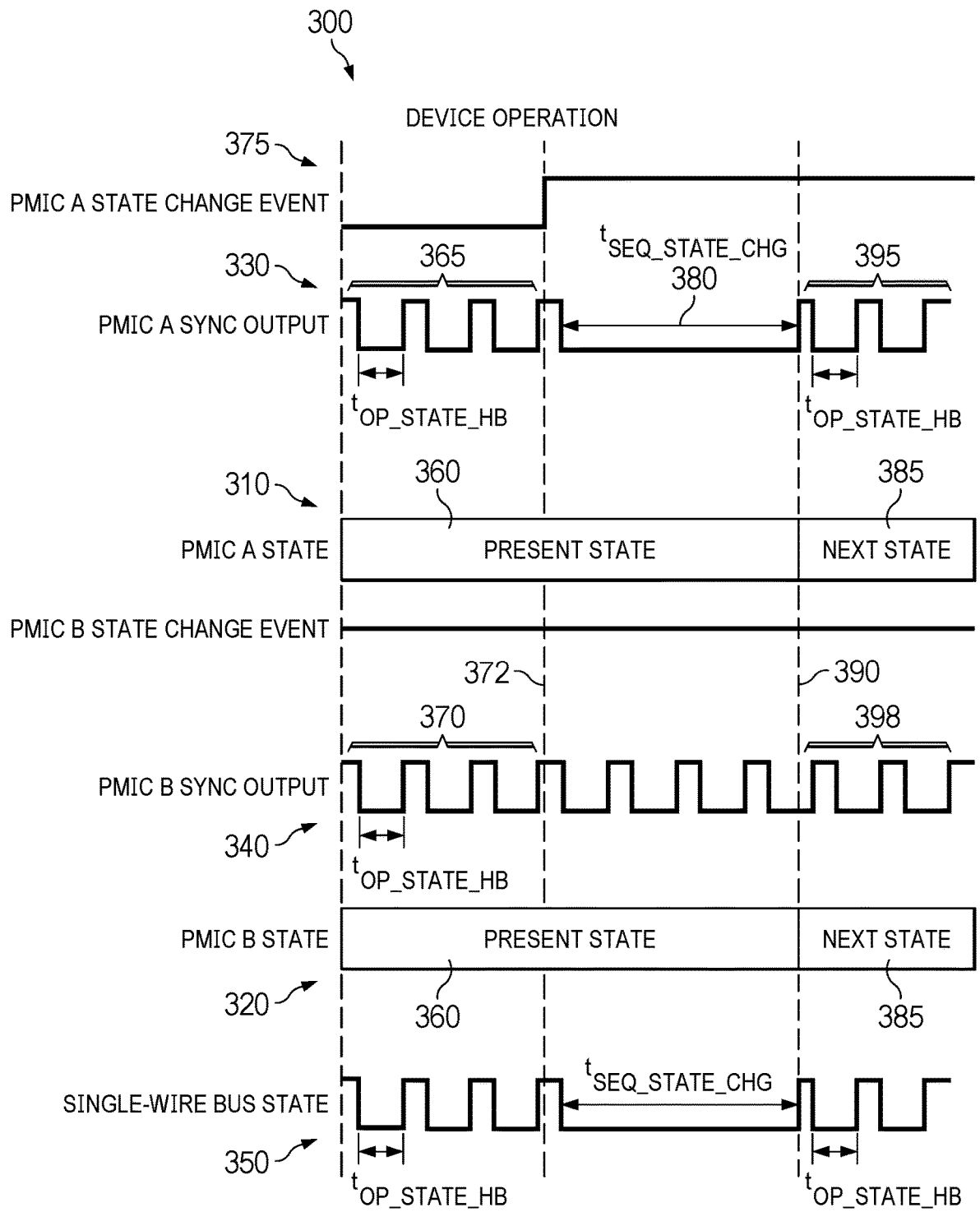

FIGS. 2 and 3 illustrate an example device initialization timing diagram 200 and an example device operation timing diagram 300 that demonstrate example device initialization and device operation aspects of the single-wire interface protocol implemented by the state synchronization circuitry 115-120 in the example environment 100 of FIG. 1. The device initialization timing diagram 200 of FIG. 2 includes an example first PMIC state trace 210 to illustrate an example sequence of device states implemented by the first PMIC device 105 after the enable signal 175 coupled to the enable terminal 165 of first PMIC device 105 is asserted. As shown in the illustrated example, the first PMIC device 105 starts in an example one-time programmable memory load (OTP_LOAD) 212 state in which the first PMIC device 105 loads its internal configuration from NVM. Then, the first PMIC device 105 transitions to an example wake (WAKE) state 214 during which the first PMIC device 105 checks for valid wakeup conditions. Then, the first PMIC device 105 transitions to an example power tree (PWR_TREE) state 216 during which the first PMIC device 105 enables its internal circuitry, biases, clocks, etc. After the first PMIC device 105 completes its initialization sequence and detects that all other PMIC devices connected via the single wire synchronization interface 195 have completed their initialization sequences (as described in further detail below), the first PMIC device 105 transitions to normal operation.

Likewise, the device initialization timing diagram 200 of FIG. 2 includes an example second PMIC state trace 220 to illustrate an example sequence of device states implemented by the second PMIC device 110 after the enable signal 175 coupled to the enable terminal 170 of second PMIC device 110 is asserted. As shown in the illustrated example, the second PMIC device 110 also starts in an example one-time programmable memory load (OTP_LOAD) 222 state in which the second PMIC device 110 loads its internal configuration from NVM. Then, the second PMIC device 110 transitions to an example wake (WAKE) state 224 during which the second PMIC device 110 checks for valid wakeup conditions. Then, the second PMIC device 110 transitions to an example power tree (PWR_TREE) state 226 during which the second PMIC device 110 enables its internal circuitry, biases, clocks, etc. After the second PMIC device 110 completes its initialization sequence and detects that all other PMIC devices connected via the single wire synchronization interface 195 have completed their initialization sequences (as described in further detail below), the second PMIC device 110 transitions to normal operation.

The device initialization timing diagram 200 of FIG. 2 also includes an example first PMIC synchronization trace 230, an example second PMIC synchronization trace 235 and an example single-wire bus interface trace 240 that illustrate example operation of the state synchronization circuitry 115-120 of the PMIC devices 105-110 to initially synchronize the device states of the PMIC devices 105-110 after activation based on the enable signal 175. More specifically, in the illustrated example of FIG. 2, a goal of the initial synchronization procedure performed by the state synchronization circuitry 115-120 of the PMIC devices 105-110 is to synchronize the entry of both PMIC devices 105-110 into their respective power-up sequence (PWRU_SEQ) states 218, 228 to occur at the same time 245 or substantially the same time 245 (e.g., within a tolerance interval). In the illustrated example, the first PMIC synchronization trace 230 illustrates how the state synchronization circuitry 115 drives the synchronization terminal 185 of the first PMIC device 105 to transmit information and commands on the single wire synchronization interface 195 to perform its initial synchronization procedure. Similarly, the second PMIC synchronization trace 235 illustrates how the state synchronization circuitry 120 drives the synchronization terminal 190 of the second PMIC device 110 to transmit information and commands on the single wire synchronization interface 195 to perform its initial synchronization procedure. The single-wire bus interface trace 240 illustrates the state of the single wire synchronization interface 195 resulting from the outputs of the synchronization terminal 185 of the first PMIC device 105 and the synchronization terminal 190 of the second PMIC device 110.

As noted above, the state synchronization circuitry 115-120 implements a single-wire open-drain protocol on the single wire synchronization interface 195, which uses low-time on the interface to communicate commands and other information. As such, the single-wire synchronization interface 195 operates between a first voltage (e.g., a low voltage level, such as ground or some other voltage corresponding to a low logic value) and a second voltage (e.g., a high voltage level, such as 5 volts, 3.3 volts, etc., or some other voltage corresponding to a high logic value). Thus, the state synchronization circuitry 115 includes an open-drain driver to pull the synchronization terminal 185 of the first PMIC device 105 to the first (e.g., low) voltage value for durations to signal commands and other information on the single-wire synchronization interface 195. Likewise, the state synchronization circuitry 120 includes an open-drain driver to pull the synchronization terminal 190 of the second PMIC device 110 to the first (e.g., low) voltage value for durations to signal commands and other information on the single-wire synchronization interface 195.

In the illustrated example of FIG. 2, the state synchronization circuitry 115-120 of the PMIC devices 105-110 begins the initial synchronization procedure at a time 250 at which the enable signal 175 is asserted. In response, the state synchronization circuitry 115 pulls the synchronization terminal 185 of the first PMIC device 105 low (e.g., to the first/low voltage value) as shown in the first PMIC synchronization trace 230, and the state synchronization circuitry 120 pulls the synchronization terminal 190 of the second PMIC device 110 low (e.g., to the first/low voltage value) as shown in the second PMIC synchronization trace 235. As a result, the single-wire synchronization interface 195 is driven low (e.g., to the first/low voltage value) as shown in the single-wire bus interface trace 240.

In the illustrated example, the state synchronization circuitry 115-120 of the PMIC devices 105-110 continue to pull their respective synchronization terminals 185-190 down until their respective PMIC devices 105-110 complete their respective initialization sequences. In the example of FIG. 2, the first PMIC device 105 completes its initialization sequence at time 255 and, thus, the state synchronization circuitry 115 releases the synchronization terminal 185 of the PMIC device 105 at that time, as shown in the first PMIC synchronization trace 230. However, the second PMIC device 110 has not completed its initialization sequence at time 255, so the state synchronization circuitry 115 continues to drive the synchronization terminal 190 of the PMIC device 110 low. As a result, the single-wire synchronization interface 195 remains low as shown in the single-wire bus interface trace 240. The state synchronization circuitry 115 of the PMIC device 105 and the state synchronization circuitry 120 of the PMIC device 110 both detect that the single-wire synchronization interface 195 is in its low state and, thus, power rail activation is still underway.

Later, at time 260, the second PMIC device 110 completes its initialization sequence and, thus, the state synchronization circuitry 120 releases the synchronization terminal 190 of the PMIC device 110 at that time, as shown in the second PMIC synchronization trace 235. Because the first PMIC device 105 already released its synchronization terminal 185 at the earlier time 255, the single-wire synchronization interface 195 floats to its high state as shown in the single-wire bus interface trace 240. The state synchronization circuitry 115 of the PMIC device 105 and the state synchronization circuitry 120 of the PMIC device 110 both detect that the single-wire synchronization interface 195 is in its high state and, thus, the initialization sequence is complete. As a result, the state synchronization circuitry 115 pulls the synchronization terminal 185 of the first PMIC device 105 low for an example duration 265 to signal a command on the single-wire synchronization interface 195 to transition the device states of the connected PMIC devices 105-110 to their respective power-up sequence (PWRU_SEQ) states 218, 228. Likewise, the state synchronization circuitry 120 pulls the synchronization terminal 190 of the second PMIC device 110 low for an example duration 270 (which corresponds to the example duration 265) to signal a command on the single-wire synchronization interface 195 to transition the device states of the connected PMIC devices 105-110 to their respective power-up sequence (PWRU_SEQ) states 218, 228. Because synchronization has been achieved, the single-wire synchronization interface 195 is pulled low over that same duration (represented by reference numeral 275 in FIG. 2). Afterwards, the single-wire synchronization interface 195 floats back to its high state, which is detected by the state synchronization circuitry 115-120, which cause their respective PMIC devices 105-110 to transition to their respective power-up sequence (PWRU_SEQ) states 218, 228, which completes the initialization procedure. The state synchronization circuitry 115 then pulls the synchronization terminal 185 of the first PMIC device 105 low repeatedly based on a repetition period and low duration corresponding to a heartbeat command to be signaled on the single-wire synchronization interface 195 (corresponding to waveform 285 of FIG. 2). Likewise, the state synchronization circuitry 120 pulls the synchronization terminal 190 of the second PMIC device 110 low repeatedly based on the repetition period and low duration corresponding to a heartbeat command to be signaled on the single-wire synchronization interface 195 (corresponding to waveform 290 of FIG. 2).

Turning to the FIG. 3, the example device operation timing diagram 300 corresponds to an example in which the state synchronization circuitry 115-120 of the PMIC devices 105-110 utilize the single-wire synchronization interface 195 to maintain synchronization of the states of the PMIC devices 105-110 after a state transition initiated by the PMIC device 105. The device operation timing diagram 300 includes an example first PMIC state trace 310 to illustrate an example sequence of device states implemented by the first PMIC device 105 during device operation after initialization. The device operation timing diagram 300 also includes an example second PMIC state trace 320 to illustrate an example sequence of device states implemented by the second PMIC device 110 during device operation after initialization. The device operation timing diagram 300 further includes an example first PMIC synchronization trace 330, an example second PMIC synchronization trace 340 and an example single-wire bus interface trace 350 that illustrate example operation of the state synchronization circuitry 115-120 of the PMIC devices 105-110 to maintain synchronization of the states of the PMIC devices 105-110 after the state transition initiated by the PMIC device 105.

In the illustrated example of FIG. 3, the device operation timing diagram 300 begins with the PMIC devices 105-110 synchronized in an example present state 360. While in the present state 360, the state synchronization circuitry 115 pulls the synchronization terminal 185 of the first PMIC device 105 low repeatedly based on a repetition period and low duration corresponding to a heartbeat command to be signaled on the single-wire synchronization interface 195 (corresponding to waveform 365 of FIG. 3). Likewise, the state synchronization circuitry 120 pulls the synchronization terminal 190 of the second PMIC device 110 low repeatedly based on the repetition period and low duration corresponding to a heartbeat command to be signaled on the single-wire synchronization interface 195 (corresponding to waveform 370 of FIG. 3). This causes the single-wire synchronization interface 195 to be pulled low over that same duration, as shown in the single-wire bus interface trace 350.

At a time 372, the state synchronization circuitry 115 of the first PMIC device 105 detects a state change event as depicted by an example state change event trace 375. In response, the state synchronization circuitry 115 pulls the synchronization terminal 185 of the first PMIC device 105 low for an example duration 380 to signal a command on the single-wire synchronization interface 195 to transition the device states of the connected PMIC devices 105-110 from the present state 360 to an example next state 385. This causes the single-wire synchronization interface 195 to be pulled low over that same duration, as shown in the single-wire bus interface trace 350. Afterwards, the single-wire synchronization interface 195 floats back to its high state at time 390, which is detected by the state synchronization circuitry 115-120, which cause their respective PMIC devices 105-110 to transition to the next state 385 in a synchronized manner. The state synchronization circuitry 115 then pulls the synchronization terminal 185 of the first PMIC device 105 low repeatedly based on a repetition period and low duration corresponding to a heartbeat command to be signaled on the single-wire synchronization interface 195 (corresponding to waveform 395 of FIG. 3). Likewise, the state synchronization circuitry 120 pulls the synchronization terminal 190 of the second PMIC device 110 low repeatedly based on the repetition period and low duration corresponding to a heartbeat command to be signaled on the single-wire synchronization interface 195 (corresponding to waveform 398 of FIG. 3).

Figure 4:
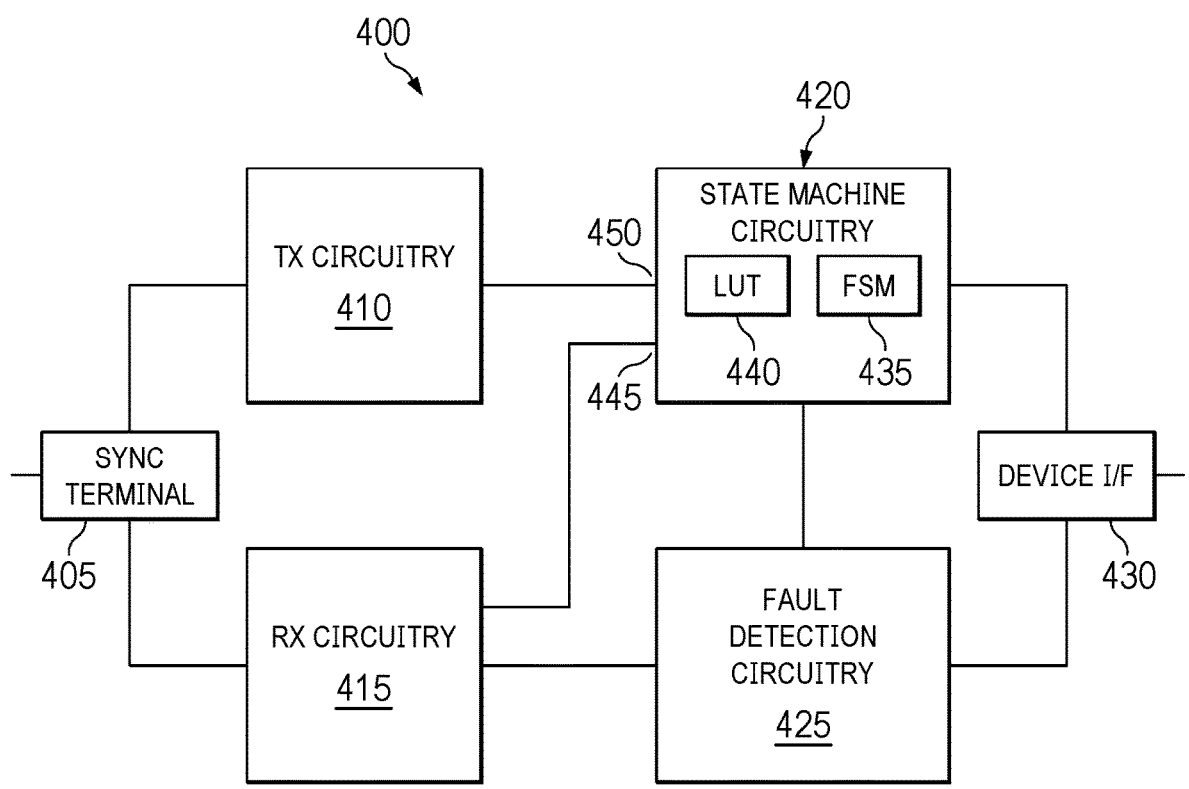
FIG. 4 is a block diagram of an example implementation of the state synchronization circuitry of FIG. 1.

A block diagram of example state synchronization circuitry 400, which may be used to implement the state synchronization circuitry 115 and/or 120 of FIG. 1, is illustrated in FIG. 4. The state synchronization circuitry 400 of FIG. 4 may be implemented with one more integrated circuits, digital circuits, analog circuits, etc., or any combination thereof. Additionally or alternatively, the state synchronization circuitry 400 of FIG. 4 may be instantiated (e.g., creating an instance of, bring into being for any length of time, materialize, implement, etc.) by programmable circuitry such as a Central Processor Unit (CPU) executing first instructions. Additionally or alternatively, the state synchronization circuitry 400 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

Turning to FIG. 4, the example state synchronization circuitry 400, which may be included in an example device such as the PMIC device 105 and/or the PMIC device 110, includes an example synchronization terminal 405, example transmit circuitry 410, example receive circuitry 415, example state machine circuitry 420, example fault detection circuitry 425 and an example device interface 430. The synchronization terminal 405 can implement the synchronization terminals 185 and/or 190 of FIG. 1 to interface with the single wire synchronization interface 195. As such, the synchronization terminal 405 can be implemented by a pin (e.g., a general purpose input output (GPIO) pin), a trace, a wire, a connector, etc.

The example transmit circuitry 410 includes an open-drain driver to pull the synchronization terminal 405 to a first logic value (e.g., a low voltage level, such as ground or some other voltage corresponding to a low logic value) for different durations to signal different commands and other information on the single-wire synchronization interface 195. As noted above, the single-wire synchronization interface 195 operates between the first logic value (e.g., a low voltage level, such as ground or some other voltage corresponding to a low logic value) and a second logic value (e.g., a high voltage level, such as 5 volts, 3.3 volts, etc., or some other voltage corresponding to a high logic value). The transmit circuitry 410 causes its open-drain driver to release the single-wire synchronization interface 195 when not sending commands or other information, which allows the single-wire synchronization interface 195 to float to its second (high) voltage if no other terminal connected to the single-wire synchronization interface 195 is pulling the single-wire synchronization interface 195 down.

In the illustrated example, the transmit circuitry 410 also includes one or more counters/timers, programmable circuitry and/or other logic circuitry configured to control the open-drain driver to pull the synchronization terminal 405 to the first (low) logic value for a particular duration corresponding to a particular command to be communicated via the synchronization terminal 405. The particular duration is one or multiple (e.g., at least three) possible signal durations that correspond respectively to multiple possible commands, including the first command, which can be communicated via the single-wire synchronization interface 195. In the illustrated example, the multiple possible commands are associated with device operation states to be synchronized between a device including the state synchronization circuitry 400 and one or more other devices coupled to the synchronization terminal 405 via the single-wire synchronization interface 195. For example, the multiple possible commands may include the first command which is associated with a first signal duration over which the synchronization terminal 405 is pulled to the first (low) logic value, and a second command corresponding to a second signal duration that is longer than the first signal duration. Because the single-wire synchronization interface 195 is based on an open-drain protocol, longer signal durations can be associated with higher priority commands. For example, if two devices are sending two different commands on the single-wire synchronization interface 195, the single-wire synchronization interface 195 will be held low for the longer of the commands, and the devices coupled to the single-wire synchronization interface 195 will detect the longer (e.g., higher priority) state command and take the state transition corresponding to that command.

In some examples, the multiple possible commands also include a heartbeat command corresponding to the lowest possible signal duration, and which is sent repeatedly by the transmit circuitry 410 based on a repetition period when no other command or information is to be transmitted by the transmit circuitry 410. The heartbeat provides additional diagnostics and fault detection. For example, without the heartbeat command, if the single-wire synchronization interface 195 gets stuck high or low in an active state, the devices coupled to the single-wire synchronization interface 195 could not send or receive any state commands and, thus, not take any state transitions, thereby causing a system using those devices to lock up. This is not acceptable for many systems including functional safety systems. With the heartbeat command, the devices coupled to the single-wire synchronization interface 195 can monitor the bus and detect if the terminal 405 coupled to the single-wire synchronization interface 195 gets stuck high or low. This allows the system to process the error and shut down or take other appropriate responsive action.

In some examples, the multiple possible commands are arranged into multiple different command groups associated with different states of a state machine to be synchronized among a device including the state synchronization circuitry 400 and one or more other devices coupled to the synchronization terminal 405 via the single-wire synchronization interface 195. The command groups are determined based on the valid state transitions out of those states. For example, a first command group can be associated with a first state of the state machine and can include commands to request transitions from that first state to other states reachable from that first state. Likewise, a second command group can be associated with a second state of the state machine and can include commands to request transitions from that second state to other states reachable from that second state. As disclosed in further detail below, one or more (or all) of the different signal durations used to represent a corresponding one or more (or all) of the commands in one command group can be re-used to represent one or more (or all) of the commands in a different command group. For example, a first command in a first command group can be represented with the same signal duration on the single-wire synchronization interface 195 as a second command in a second command group. This is because the state machines of the different devices on the single-wire synchronization interface 195 are synchronized and, thus, the different devices know the current state of the state machine and the particular command group associated with that state. Re-using signal durations across different command groups prevents having too many commands across a large state machine, which could cause higher-priority commands to take too much time to complete.

In some examples, a command group are associated with respective groups of states (also referred to as state groups) rather than just a single state. In such examples, a command group for a given state group includes commands to specify the valid transitions among the states in that state group. For example, a first state group might contain ACTIVE, SAFE and BIST (built-in self-test) states such that when a device is in any of those states, there are valid state transitions to any of the other states in the group, and also to power-down sequence (PWRD_SEQ) state in case of any fault. In such an example, a first command group associated with that first state group can include four (4) different bus commands to represent the four (4) state transition requests to the ACTIVE, SAFE, BIST, and PWRD_SEQ states, as well as a firth heartbeat command, as follows.

Command 1: Heartbeat
Command 2: Transition to ACTIVE
Command 3: Transition to SAFE
Command 4: Transition to BIST
Command 5: Transition to PWRD_SEQ Continuing the example, a second state group may include only a low-power STANDBY state, which can transition to a power-up sequence (PWRU_SEQ) state on wakeup, or to the PWRD_SEQ state on a fault or power-down request. In such an example, a second command group associated with that second state group can include two (2) different bus commands to represent for the two (2) state transition requests to the PWRU_SEQ and PWRD_SEQ states, as well as a third heartbeat command, and a fourth STANDBY command to signal a command to stay in the STANDBY state, as follows.

Command 1: Heartbeat
Command 2: Transition to PWRU_SEQ
Command 3: Stay in STANDBY
Command 4: Transition to PWRD_SEQ Because signal durations can be re-used across command groups, the same four signal durations used to represent Commands 1-4 in the first command group can be used to represent Commands 1-4 in the second command group. In other words, Commands 1-4 in the first command group can have the same respective durations as Commands 1-4 in the second command group. This prevents having too many commands across a large state machine which could cause higher-priority commands to take much longer time. In the preceding example, the use of two command groups enables encoding 7 unique state transitions into just 5 commands, reducing the amount of time (e.g., delay) needed to signal the highest-priority command.

Figure 5:
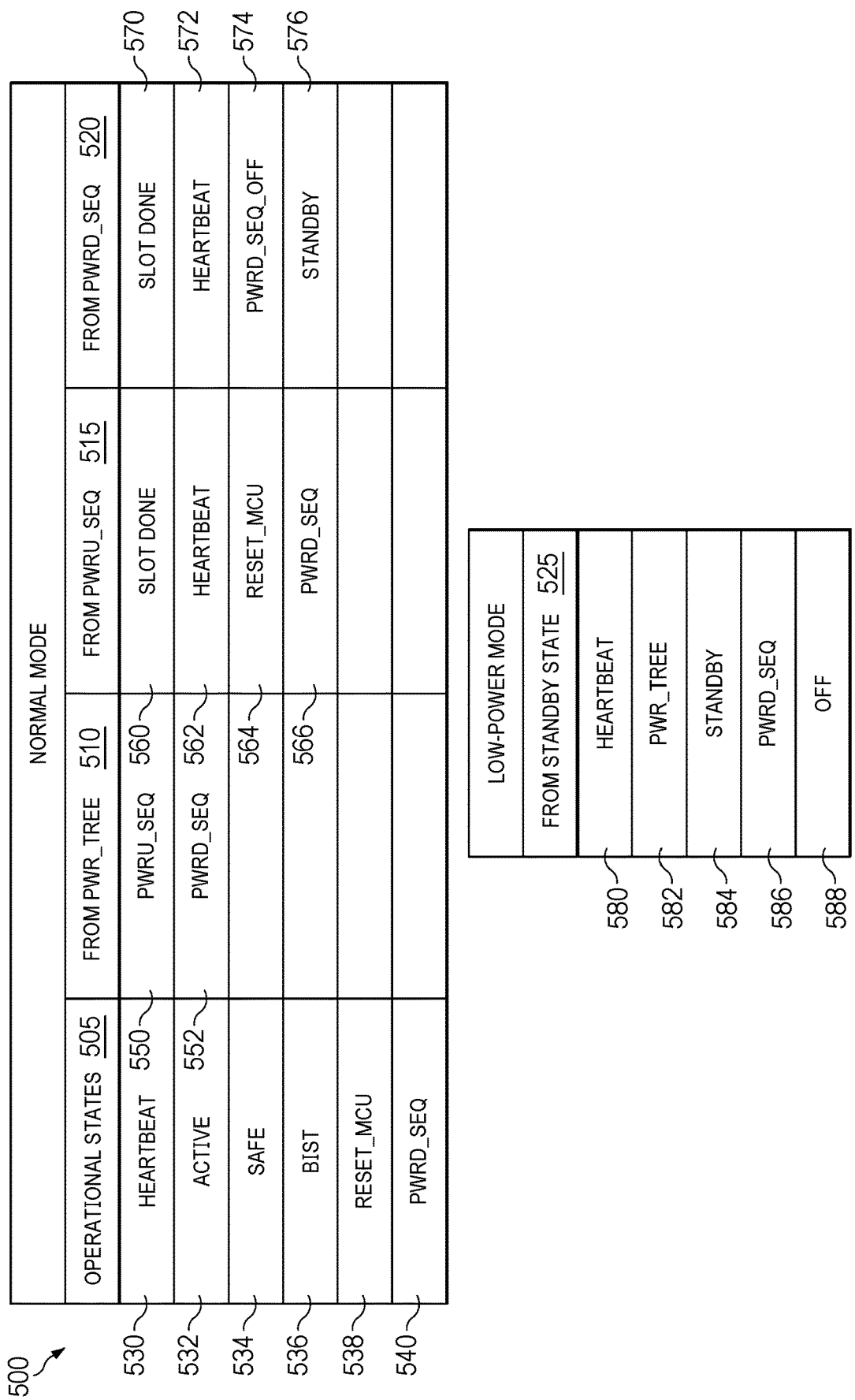
FIG. 5 illustrates example state machine command groups utilized by the example state synchronization circuitry of FIG. 4.

FIGS. 5 and 6 illustrate another example of state machine command groups and command signal durations utilized by the state synchronization circuitry 400 of FIG. 4. The example of FIGS. 5 and 6 corresponds to a state machine with 10 state commands (8 state transition commands, a heartbeat command, and a sequence slot done command) encoded into 6 different bus commands using 5 different command groups. In the illustrated example of FIG. 5, example state commands 500 corresponding to the possible valid state transitions are encoded into a first example state command group 505, a second example state command group 510, a third example state command group 515, a fourth example state command group 520 and a fifth example state command group 525. The first state command group 505 specifies a collection of general operation state transition commands, which include the following:

Example Command 530: Heartbeat;
Example Command 532: Transition to ACTIVE (as described above);
Example Command 534: Transition to SAFE (as described above);
Example Command 536: Transition to BIST (as described above);
Example Command 538: Transition to RESET_MCU (corresponding to a microcontroller reset state); and
Example Command 540: Transition to PWRD_SEQ (corresponding to a power down sequence state).

The second state command group 510 specifies a collection of state transition commands from the PWR_TREE state described above, which include the following:

Example Command 550: Transition to PWRU_SEQ (as described above); and
Example Command 552: Transition to PWRD_SEQ (as described above).

The third state command group 515 specifies a collection of state transition commands from the PWRU_SEQ state, which include the following:

Example Command 560: Slot Done (e.g., corresponding to a command to indicate a slot time associated with activation of a given power rail is complete);
Example Command 562: Heartbeat;
Example Command 564: Transition to RESET_MCU (as described above); and
Example Command 566: Transition to PWRD_SEQ (as described above).

The fourth state command group 520 specifies a collection of state transition commands from the PWRD_SEQ state, which include the following:

Example Command 570: Slot Done (as described above);
Example Command 572: Heartbeat;
Example Command 574: Transition to PWRD_SEQ_OFF (corresponding to a state to turn the device off after the power down sequence has completed); and
Example Command 576: Transition to STANDBY (corresponding to a low power device state).

The fifth state command group 525 specifies a collection of state transition commands from the low power STANDBY state, which include the following:

Example Command 580: Heartbeat;
Example Command 582: Transition to PWR_TREE (as described above);
Example Command 584: Transition to STANDBY (as described above);
Example Command 586: Transition to PWRD_SEQ (as described above); and Example Command 588: Transition to OFF (corresponding to a device off state).

FIG. 6 illustrates example signal durations 600 that can be used to represent the example commands 500 of FIG. 5. The example signal durations 600 include a first example signal duration 605 that corresponds to a transmit duration of 1-2 microseconds and a receive (detection) duration of less than or equal to 3 microseconds, a second example signal duration 610 that corresponds to a transmit duration of 5-7 microseconds and a receive (detection) duration of 4-9 microseconds, a third example signal duration 615 that corresponds to a transmit duration of 15-17 microseconds and a receive (detection) duration of 10-19 microseconds, a fourth example signal duration 620 that corresponds to a transmit duration of 22-25 microseconds and a receive (detection) duration of 20-28 microseconds, a fifth example signal duration 625 that corresponds to a transmit duration of 33-36 microseconds and a receive (detection) duration of 29-39 microseconds and a sixth example signal duration 630 that corresponds to a transmit duration of 44-48 microseconds and a receive (detection) duration of 40-50 microseconds. In the illustrated example of FIGS. 5 and 6, the signal durations 600 can be reused across commands in different ones of the command groups 505-525. For example, the first signal duration 605 of FIG. 6 can be used to represent example commands 530, 550, 560, 570 and 580 of FIG. 5. Likewise, the second signal duration 610 of FIG. 6 can be used to represent example commands 532, 552, 562, 572 and 582 of FIG. 5. Likewise, the third signal duration 615 of FIG. 6 can be used to represent example commands 534, 564, 574 and 584 of FIG. 5. Likewise, the fourth signal duration 620 of FIG. 6 can be used to represent example commands 536, 566, 576 and 586 of FIG. 5. Likewise, the fifth signal duration 625 of FIG. 6 can be used to represent example commands 538 and 588 of FIG. 5. And, the sixth signal duration 630 of FIG. 6 can be used to represent the example command 540 of FIG. 5. In some examples, different, shorter signal durations may be defined for the fifth state command group 525 corresponding to the low power STANDBY state to reduce power consumption by the state synchronization circuitry 400 during that low power state.

Returning to FIG. 4, the example receive circuitry 415 of the state synchronization circuitry 400 includes one or more counters/timers, programmable circuitry and/or other logic circuitry configured to monitor the synchronization terminal 405 to detect the state of and/or commands on the single-wire synchronization interface 195. As described above, the single-wire synchronization interface 195 can operate between a first voltage (e.g., a low voltage level, such as ground or some other voltage corresponding to a low logic value) and a second voltage (e.g., a high voltage level, such as 5 volts, 3.3 volts, etc., or some other voltage corresponding to a high logic value), and commands can be signaled by pulling the single-wire synchronization interface 195 to its first (e.g., low) voltage level for a particular duration of time corresponding to a particular command. In the illustrated example, the receive circuitry 415 monitors the logic (e.g., voltage) level of the synchronization terminal 405, which corresponds to the logic (e.g., voltage) level of the single-wire synchronization interface 195, to detect signal durations corresponding to time intervals over which the single-wire synchronization interface 195 is pulled to its first (e.g., low) voltage level. In response to detecting such a signal duration, the receive circuitry 415 provide the detected signal duration to the example state machine circuitry 420, which decodes the detected signal duration into a detected state command and processes the detected state command accordingly.

In the illustrated example, the state machine circuitry 420 of the state synchronization circuitry 400 includes an example finite state machine (FSM) 435 and an example lookup table (LUT) 440. The example FSM 435 includes programmable circuitry, logic circuitry, data structures, etc., to implement a state machine that translates commands from device interface 430 to the transmit circuitry 410, and translates commands from receive circuitry 415 to the device interface 430. The LUT 440 maps state commands to signal durations and vice versa, maps states to state groups and vice versa, maps states to command groups and vice versa, maps state groups to command groups and vice versa, etc. For example, the LUT 440 may store the example state commands 500 and state command groups 505-525 of FIG. 5, the example signal duration 600 of FIG. 6, and the mappings of the signal duration 600 to the state commands 500 described above. In some such examples, the state machine circuitry 420 can use the LUT 440 to map (or convert) a detected signal duration received from the receive circuitry 415 at an example input 445 of the state machine circuitry 420 to a corresponding detected state command (and command group if applicable). The state machine circuitry 420 can then invoke the FSM 435 to update the state of the device based on the detected state command via the device interface 430. As another example, the state machine circuitry 420 can invoke the FSM 435 responsive to a state transition event trigger received via the device interface 430 to determine the state transition to be taken in response to the event trigger. The state machine circuitry 420 can then utilize the LUT 440 to map (or convert) the state transition to an appropriate state command (e.g., which may involve mapping the state transition to a state group and/or command group), and then map (or convert) that state command to a corresponding transmit signal duration. The state machine circuitry 420 sets an example output 450 to specify the transmit signal duration to the transmit circuitry 410, which pulls the synchronization terminal 405 and, thus, the single-wire synchronization interface 195 to its first (e.g., low) voltage level for the transmit signal duration to signal the corresponding state command on the single-wire synchronization interface 195. In some examples, the state machine circuitry 420 sets its output 450 to the shortest signal duration, which corresponds to the heartbeat command (e.g., of the selected command group) by default if no other command is to be transmitted by the synchronization terminal 405 on the single-wire synchronization interface 195.

As described above, commands transmitted (or broadcast) and received via the single-wire synchronization interface 195 can include heartbeat commands that correspond to the shortest of the possible signal durations (e.g., for the current selected command group) and that are signaled repeatedly by default on the single-wire synchronization interface 195 based on a repetition periodic. In the illustrated example of FIG. 4, the state synchronization circuitry 400 includes the fault detection circuitry 425 that is invoked by the receive circuitry 415 when a heartbeat command is not detected on the bus for at least a time interval specified by a fault threshold (also referred to as the fault time interval). For example, the fault detection circuitry 425 can output an error signal or message via the device interface 430 to the device implementing the state synchronization circuitry 400. Additionally or alternatively, the fault detection circuitry 425 an instruct the state machine circuitry 420 to transition its state machine to an appropriate state (e.g., a power down state) in response to the fault time interval elapsing without a heartbeat command being detected on the single-wire synchronization interface 195.

In the illustrated example of FIG. 4, the device interface 430 of the state synchronization circuitry 400 interfaces with the other circuitry of the device which includes or otherwise implements the state synchronization circuitry 400 (e.g., such as the PMIC 105 and/or 110) to detect state transition event triggers, report error signals/messages, etc. As such, the device interface 430 can be implemented by one or more busses, traces, pins, memories, etc.

As described above in connection with FIG. 2, in some examples, the state synchronization circuitry 400 implements an initial synchronization procedure to align the timing of the devices in communication via single wire synchronization interface 195. In some such examples, the state machine circuitry 420 causes the transmit circuitry 410 to pull the synchronization terminal 405 to the first (e.g., low) voltage level of the single wire synchronization interface 195 in response to detection of a first event trigger (received via the device interface 430) corresponding to initialization of the device including the state synchronization circuitry 400 (e.g., such as the PMIC 105 or 110). For example, the state machine circuitry 420 may cause the transmit circuitry 410 to pull the synchronization terminal 405 to the first (e.g., low) voltage level upon initial power-up of the device and while the device is loading an internal configuration from NVM, enabling internal biases and clocks, activating power rails, etc. Furthermore, in some such examples, in response to subsequent second event trigger indicating that device initialization is complete, the state machine circuitry 420 causes the transmit circuitry 410 to release the synchronization terminal 405 to allow the single wire synchronization interface 195 to float to its second (e.g., high) voltage level when no other connected device is pulling the single wire synchronization interface 195 to its first (e.g., low) voltage level.

Figure 7A:
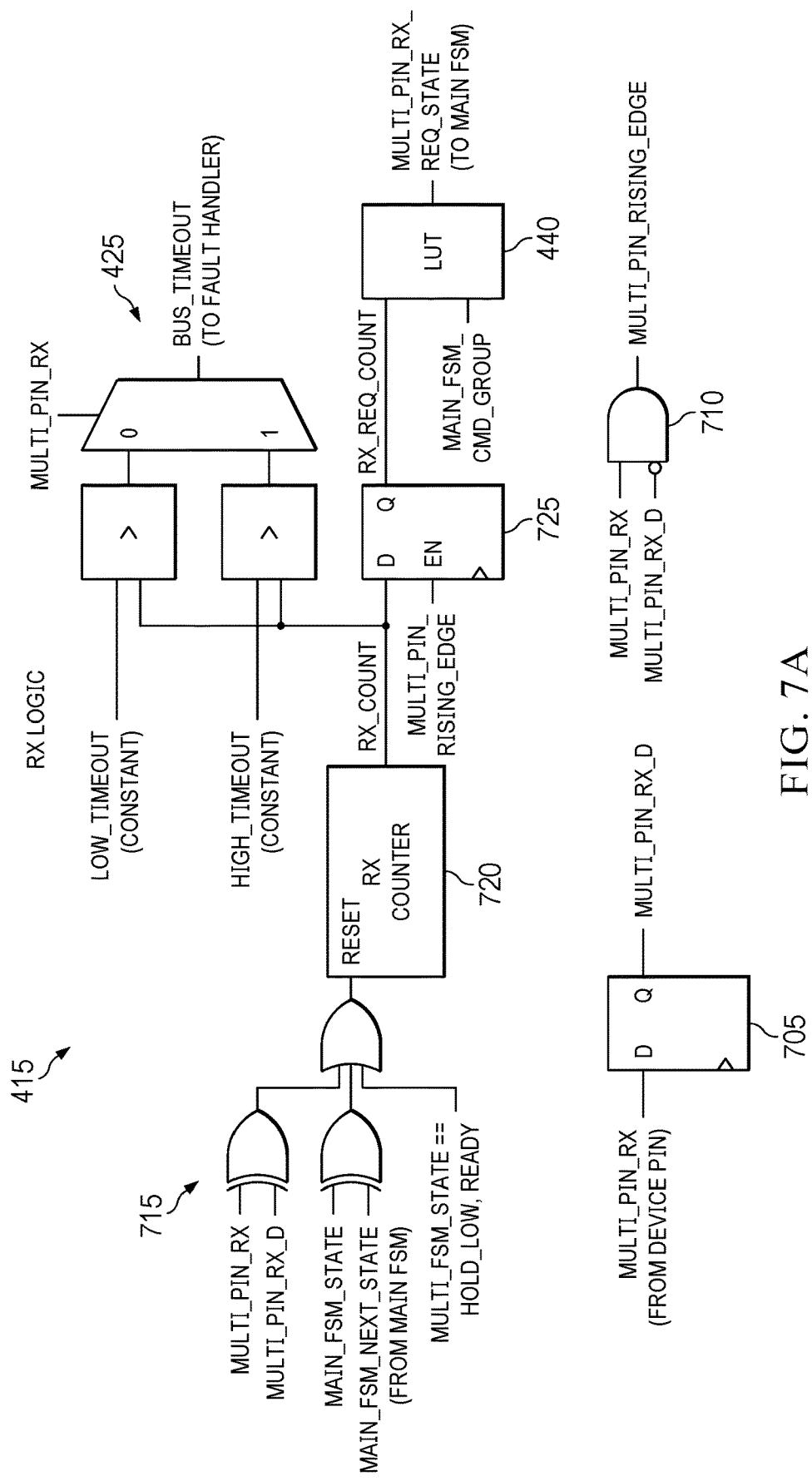
FIGS. 7A-B illustrate example implementations of transmit circuitry and receive circuitry included in the example state synchronization circuitry of FIG. 4.
Figure 7B:
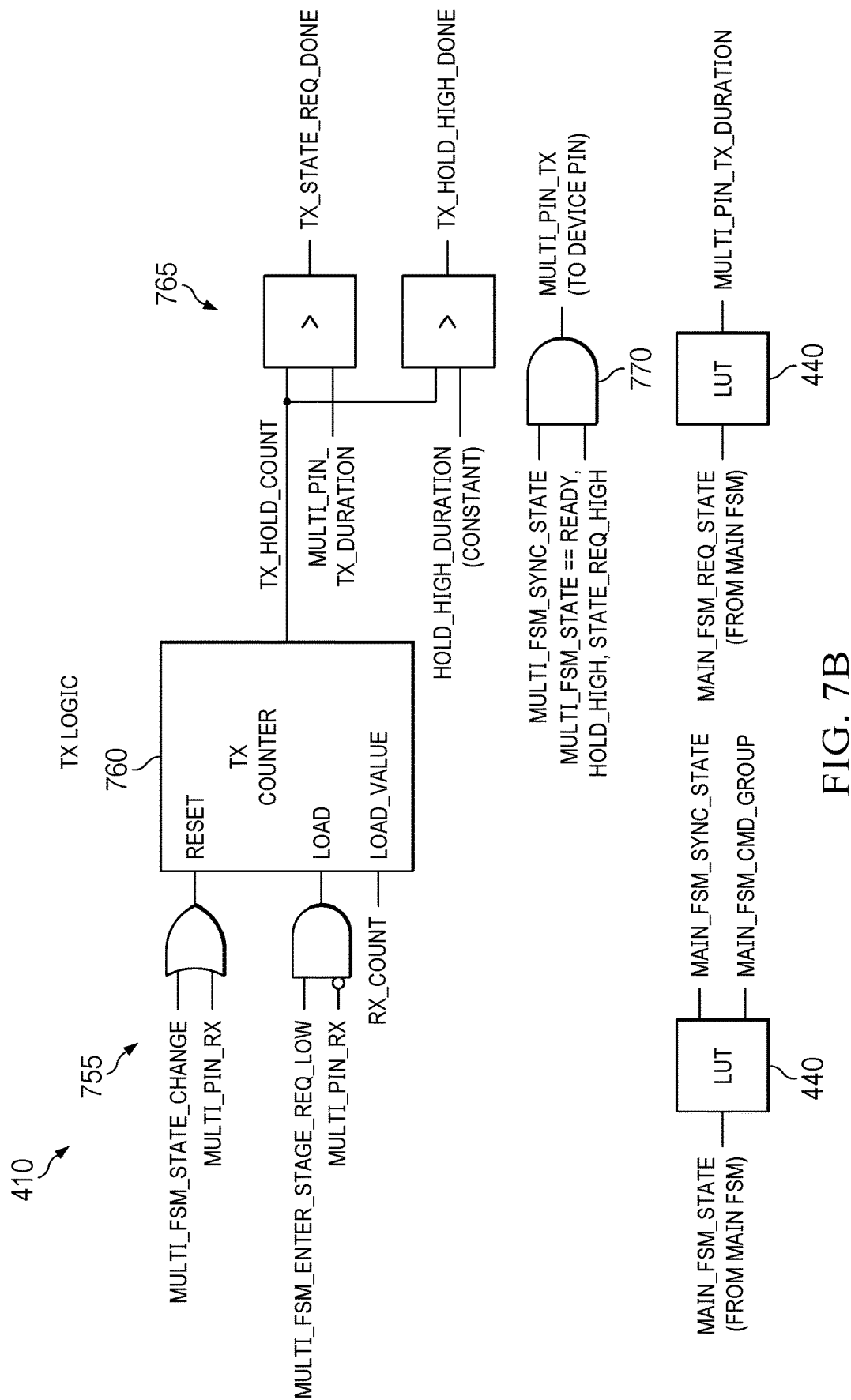

Furthermore, in some examples, the state machine circuitry 420 causes the receive circuitry 415 to monitor the synchronization terminal 405 and, thus, the state (e.g., voltage) of the single wire synchronization interface 195 in response to the detection of the first event trigger (received via the device interface 430) corresponding to initialization of the device, and in parallel with operation of the transmit circuitry 410, as described. For example, the state machine circuitry 420 configures the receive circuitry 415 to detect the transition of the synchronization terminal 405 (and, thus, the single wire synchronization interface 195) from the first (e.g., low) voltage level during the initial synchronization procedure to the second (e.g., high) voltage level at a time (e.g., after the after transmit circuitry 410 initially pulled the synchronization terminal 405 down) when the devices in communication via the single wire synchronization interface 195 have completed their respective initialization procedures and released the single wire synchronization interface 195, thereby allowing it to float to its second (e.g., high) voltage level. At that time, time alignment of the devices in communication via the single wire synchronization interface 195 is achieved. In some examples, the state machine circuitry 420 then causes its state machine to transition to a normal operations state (e.g., such as the PWRU_SEQ state described above) and causes the transmit circuitry 410 to begin repeatedly sending heartbeat commands on the single wire synchronization interface 195. For example, at a time after the detection of the transition of the synchronization terminal 405 (and, thus, the single wire synchronization interface 195) from the first (e.g., low) voltage level during the initial synchronization procedure to the second (e.g., high) voltage level, the state machine circuitry 420 may cause the transmit circuitry to repeatedly pull the synchronization terminal 405 to the first (e.g., low) voltage level for a signal duration specified by the output of the state machine circuitry 420 and corresponding to the signal duration representing the heartbeat command. The state machine circuitry 420 then continues to operate as describe above, FIGS. 7A-B illustrate example implementations of the transmit circuitry 410 and receive circuitry 415 included in the state machine circuitry 400 of FIG. 4. Table 1 below provides a legend for the signals illustrated in FIGS. 7A-B.

TABLE 1

| Signal Name | Description |
| --- | --- |
| MULTI_PIN_TX/RX | Receiving and transmitting signal for the synchronization bus pin |
| MAIN_FSM | Device-level state machine to be synchronized across devices |
| MULTI_FSM | Multi-device controller state machine |
| MAIN_FSM_REQ_STATE | Main FSM state which is being requested, to be transmitted on the bus |
| MULTI_PIN_RX_REQ_STATE | Main FSM state which is received on the bus, to which the main FSM will transition |
| *_FSM_STATE_CHANGE | FSM is taking any state transition |
| *_FSM_ENTER_* | FSM is taking a state transition to this state |

As described above, the receive circuitry 415 can be implemented with one or more counters/timers, programmable circuitry and/or other logic circuitry configured to monitor the synchronization terminal 405 to detect the state of and/or commands on the single-wire synchronization interface 195. FIG. 7A illustrates such an example implementation of the receive circuitry 415, which includes example logic circuitry in the form of an example flip-flop 705 and example logic gates 710 and 715 to monitor the synchronization terminal 405 to evaluate the logic (e.g., voltage) level of single-wire synchronization interface 195. The example receive circuitry 415 of FIG. 7A also includes an example counter 720 to detect signal durations over which the logic (e.g., voltage) level of single-wire synchronization interface 195 is pulled to its first (e.g., low) voltage level corresponding to commands communicated via the single-wire synchronization interface 195. As shown in the example of FIG. 7A, the detected signal durations are provided to the LUT 440 which, as described above, is used to decode the detected signal durations into detected state commands to be processed by the state machine circuitry 420. In the illustrated example of FIG. 7A, the receive circuitry 415 also includes an example logic implementation of the fault detection circuitry 425, which includes logic circuitry to detect whether the logic (e.g., voltage) level of single-wire synchronization interface 195 is stuck at its first (e.g., low) voltage level for over a first (e.g., low) timeout period, or stuck at its second (e.g., high) voltage level for a second (e.g., high) timeout period.

Turning to the transmit circuitry 410, as described above, the transmit circuitry 410 can be implemented with one or more counters/timers, programmable circuitry and/or other logic circuitry configured to control an open-drain driver to pull the synchronization terminal 405 to its first (low) logic value for a particular duration corresponding to a particular command to be communicated via the synchronization terminal 405. FIG. 7B illustrates such an example implementation of the transmit circuitry 410, which includes example input circuitry 755 to accept outputs from the state machine circuitry 420, which are based on the LUT 440 as shown, that specify the signal duration for which the synchronization terminal 405 is to be pulled to the first (low) logic value to transmit a specified state command. The example transmit circuitry 410 of FIG. 7B also includes an example counter 760 to count the specified signal duration, and example circuitry 765 and 770 to control the open-drain driver to pull the synchronization terminal 405 to the first (low) logic value for the specified duration.

In the preceding description, the state synchronization circuitry 115, 120 and 400 has been described in the context of implementation in a PMIC, such as the PMIC 105 and/110. However, the state synchronization circuitry 115, 120 and 400 is not limited to inclusion in and operation with PMICs. On the contrary, the state synchronization circuitry 115, 120 and 400 can be utilized with any device with a state machine and/or different operating modes to be synchronized with other devices in a larger system. For example, the state synchronization circuitry 115, 120 and 400 can be included in, implemented by or otherwise utilized with motor drivers, sensors, analog-to-digital and digital-to-analog converters, etc.

In some examples, the state synchronization circuitry 400 includes means for transmitting state commands. For example, the means for receiving state commands may be implemented by the example transmit circuitry 410. In some examples, the transmit circuitry 410 may be instantiated by programmable circuitry such as the example programmable circuitry 1012 of FIG. 10. For instance, the transmit circuitry 410 may be instantiated by the example microprocessor 1100 of FIG. 11 executing machine executable instructions such as those implemented by at least blocks 805 and 810 of FIG. 8, and blocks 910 and 940 of FIG. 9. In some examples, transmit circuitry 410 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the transmit circuitry 410 may be instantiated by any other combination of hardware, software, and/or firmware. For example, the transmit circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the state synchronization circuitry 400 includes means for receiving state commands. For example, the means for receiving state commands may be implemented by the example receive circuitry 415. In some examples, the receive circuitry 415 may be instantiated by programmable circuitry such as the example programmable circuitry 1012 of FIG. 10. For instance, the receive circuitry 415 may be instantiated by the example microprocessor 1100 of FIG. 11 executing machine executable instructions such as those implemented by at least block 815 of FIG. 8 and blocks 945-950 of FIG. 9. In some examples, receive circuitry 415 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the receive circuitry 415 may be instantiated by any other combination of hardware, software, and/or firmware. For example, the receive circuitry 415 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the state synchronization circuitry 400 includes means for implementing a state machine. For example, the means for implementing a state machine may be implemented by the example state machine circuitry 420. In some examples, the state machine circuitry 420 may be instantiated by programmable circuitry such as the example programmable circuitry 1012 of FIG. 10. For instance, the receive circuitry 415 may be instantiated by the example microprocessor 1100 of FIG. 11 executing machine executable instructions such as those implemented by at least block 820 of FIG. 8 and blocks 905, 910, 925, 935, 940, 955, 960 and 965 of FIG. 9. In some examples, state machine circuitry 420 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the state machine circuitry 420 may be instantiated by any other combination of hardware, software, and/or firmware. For example, the state machine circuitry 420 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the state synchronization circuitry 400 is illustrated in FIGS. 1 to 7A-7B, one or more of the elements, processes, and/or devices illustrated in FIGS. 1 to 7A-7B may be combined, divided, re-arranged, omitted, eliminated, and/or implemented in any other way. Further, the example synchronization terminal 405, the example transmit circuitry 410, the example receive circuitry 415, the example state machine circuitry 420, the example fault detection circuitry 425, the example device interface 430, the example FSM 435, the example LUT 440 and/or, more generally, the example state synchronization circuitry 400 may be implemented by hardware alone or by hardware in combination with software and/or firmware. Thus, for example, any of the example synchronization terminal 405, the example transmit circuitry 410, the example receive circuitry 415, the example state machine circuitry 420, the example fault detection circuitry 425, the example device interface 430, the example FSM 435, the example LUT 440 and/or, more generally, the example state synchronization circuitry 400 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example state synchronization circuitry 400 may include one or more elements, processes, and/or devices in addition to, or instead of, those illustrated in FIGS. 1 to 7A-7B, and/or may include more than one of any or all of the illustrated elements, processes and devices.

Figure 8:
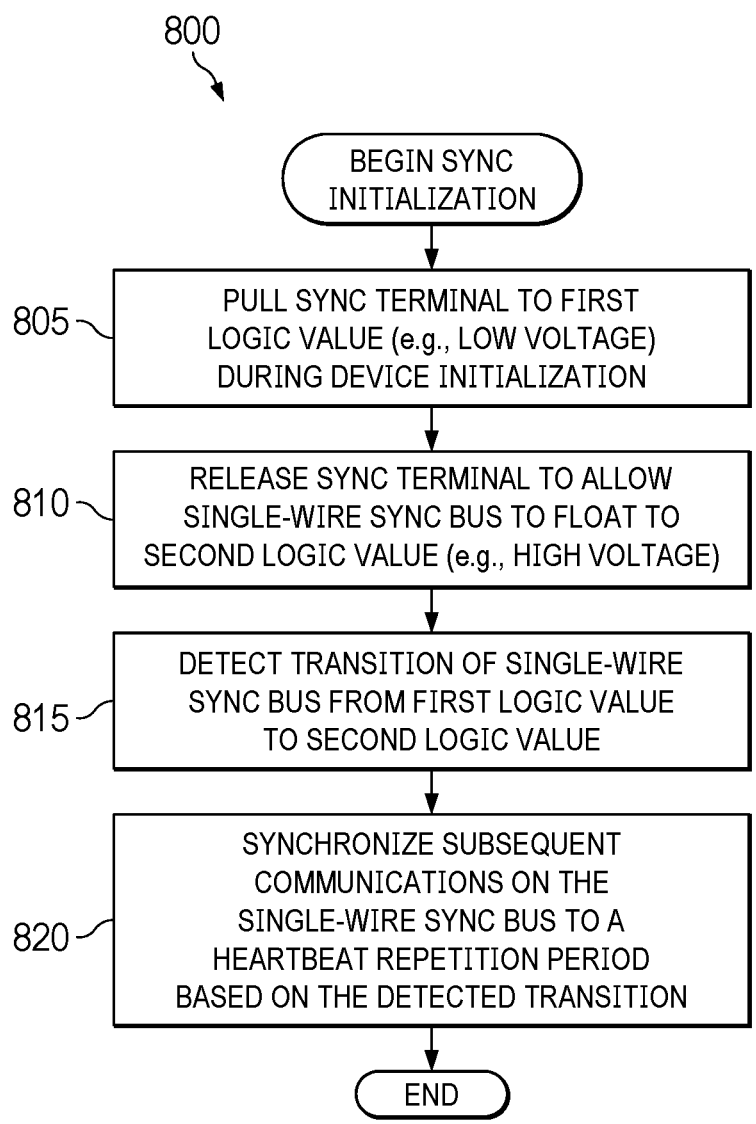
FIGS. 8-9 are flowcharts representative of example machine readable instructions and/or example operations that may be executed, instantiated, and/or performed using an example programmable circuitry implementation and/or an example hardware implementation of the state synchronization circuitry 400 of FIG. 4.
Figure 9:
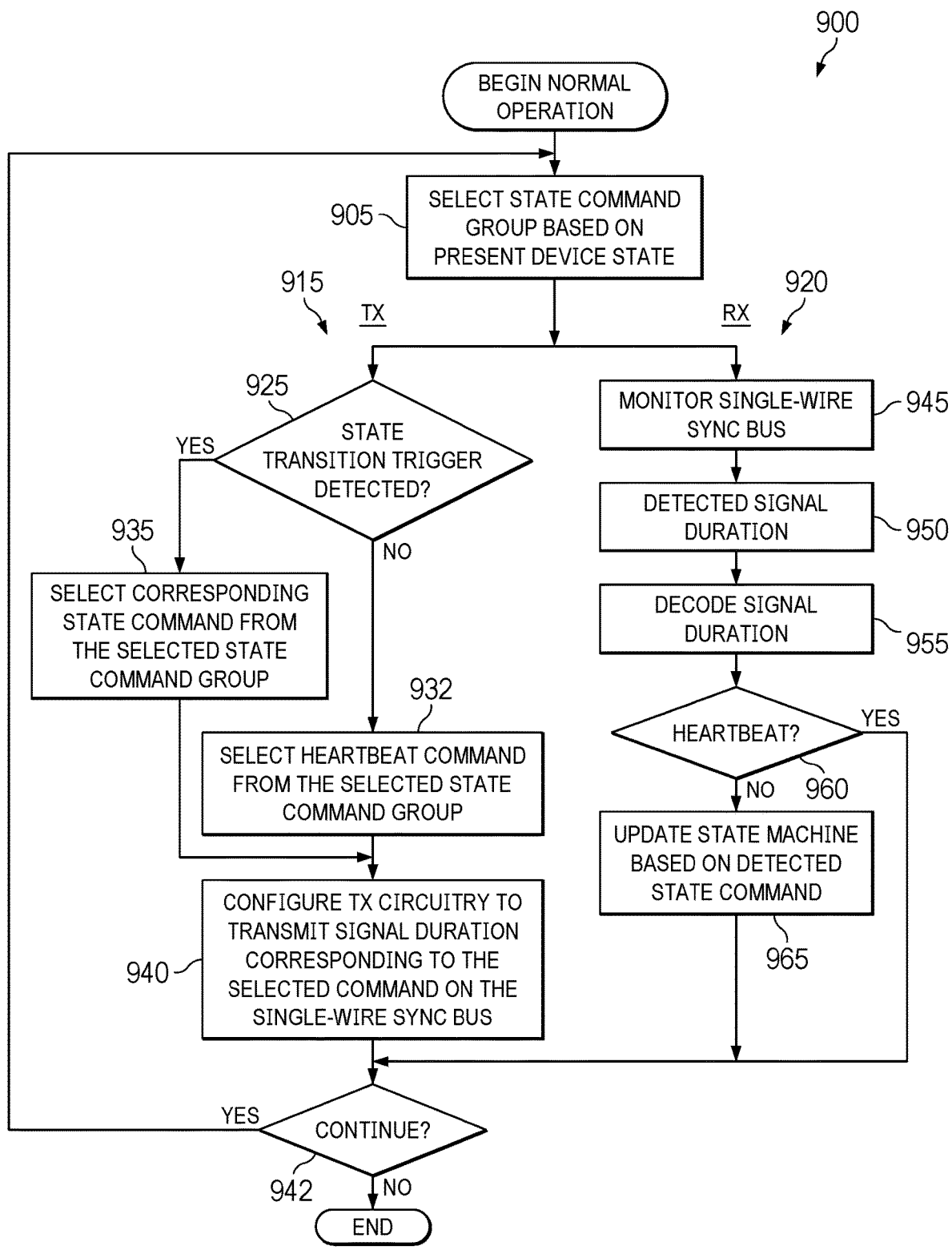

Flowchart(s) representative of example machine readable instructions, which may be executed by programmable circuitry to implement and/or instantiate the state synchronization circuitry 400 of FIGS. 1 to 7A-7B and/or representative of example operations which may be performed by programmable circuitry to implement and/or instantiate the of FIGS. 1 to 7A-7B are shown in FIGS. 8-9. The machine readable instructions may be one or more executable programs or portion(s) of one or more executable programs for execution by programmable circuitry such as the programmable circuitry 1012 shown in the example processor platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 8-9, many other methods of implementing the example state synchronization circuitry 400 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/ or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone. (2) B alone, (3) C alone, (4) A with B. (5) A with C. (6) B with C, or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A. (2) at least one B. or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed, instantiated, and/or performed by programmable circuitry to implement an example initial synchronization procedure with the state synchronization circuitry 400 of FIG. 4. With reference to the preceding figures and corresponding written descriptions, the example machine-readable instructions and/or the example operations 800 of FIG. 8 begin at block 805 at which the state machine circuitry 420 causes the transmit circuitry 410 to pull the synchronization terminal 405 to a first logic value (e.g., a low voltage level) during initialization of the device including or otherwise implementing the state synchronization circuitry 400, as described above. At block 810, the state machine circuitry 420 causes the transmit circuitry 410 to release the synchronization terminal 405 after device initialization complete, as described above, which allows the single wire synchronization interface 195 to float to a second logic value (e.g., a high voltage level) when other devices connected to the single wire synchronization interface 195 are no longer pulling the single wire synchronization interface 195 to the first logic value (e.g., a low voltage level). At block 815, the state machine circuitry 420 causes the receive circuitry 415 to monitor the synchronization terminal 405 to detect a transition on the single wire synchronization interface 195 from the first logic value (e.g., a low voltage level) to the second logic value (e.g., a high voltage level), as described above. At block 820, the state machine circuitry 420 synchronizes subsequent communications on the single wire synchronization interface 195 to a heartbeat repetition period based on (e.g., beginning at) the time of the detected transition on the single wire synchronization interface 195, as described above.

FIG. 9 is a flowchart representative of example machine readable instructions and/or example operations 900 that may be executed, instantiated, and/or performed by programmable circuitry to implement an example normal operation procedure with the state synchronization circuitry 400 of FIG. 4. With reference to the preceding figures and corresponding written descriptions, the example machine-readable instructions and/or the example operations 900 of FIG. 9 begin at block 905 at which the state machine circuitry 420 selects a state command group based on a present state, as determined by the FSM 435, of a device including or otherwise implementing the state synchronization circuitry 400, as described above. In the illustrated example, the state synchronization circuitry 400 then executes an example transmit processing path 915 and an example receive processing path 920 in parallel.

In the transmit processing path 915, at block 925 the state machine circuitry 420 monitors the device interface 430 to detect a state transition trigger. If a state transition trigger is not detected (corresponding to the NO output of block 925), at block 932 the state machine circuitry 420 utilizes the LUT 440 to select the heartbeat command from the selected command group associated with the present device state, as described above. However, if a state transition trigger is detected (corresponding to the YES output of block 925), at block 935 the state machine circuitry 420 utilizes the LUT 440 to select the state command corresponding to the state transition trigger from the selected command group associated with the present device state, as described above. At block 940, the state machine circuitry 420 utilizes the LUT 440 to set its output to the signal duration corresponding to the selected heartbeat command or state command, which configures the transmit circuitry 410 to transmit a signal duration (e.g., by pulling the synchronization terminal 405 to the first logic value (e.g., a low voltage level)) on the single-wire synchronization interface 195 that corresponds to the selected heartbeat command or state command, as described above. Processing then proceeds to block 942.

In the receive processing path 920, at block 945 the receive circuitry 415 monitors the synchronization terminal 405 to evaluate the logic value (e.g., voltage level) of the single-wire synchronization interface 195, as described above. At block 950, the receive circuitry 415 detects a signal duration over which the single-wire synchronization interface 195 is pulled to the first logic value (e.g., a low voltage level) and provides the detected signal duration to the state machine circuitry 420, as described above. At block 955, the state machine circuitry 420 utilizes the LUT 440 to decode the detected signal duration into a detected state command, as described above. At block 960, the state machine circuitry 420 determines whether the detected state command corresponds to a heartbeat command. If the detected state command corresponds to the heartbeat command (corresponding to the YES output of block 960), processing proceeds to block 942. However, if the detected state command does not correspond to the heartbeat command (corresponding to the NO output of block 960), at block 965 the state machine circuitry 420 invokes the FSM 435 to update its state machine based on the detected state command, as described above. Processing then proceeds to block 942.

At block 942, the state machine circuitry 420 determines whether operation is to continue. If operation is to continue, processing returns to block 905 and blocks subsequent thereto. Otherwise, the example machine-readable instructions and/or the example operations 900 end.

Figure 10:
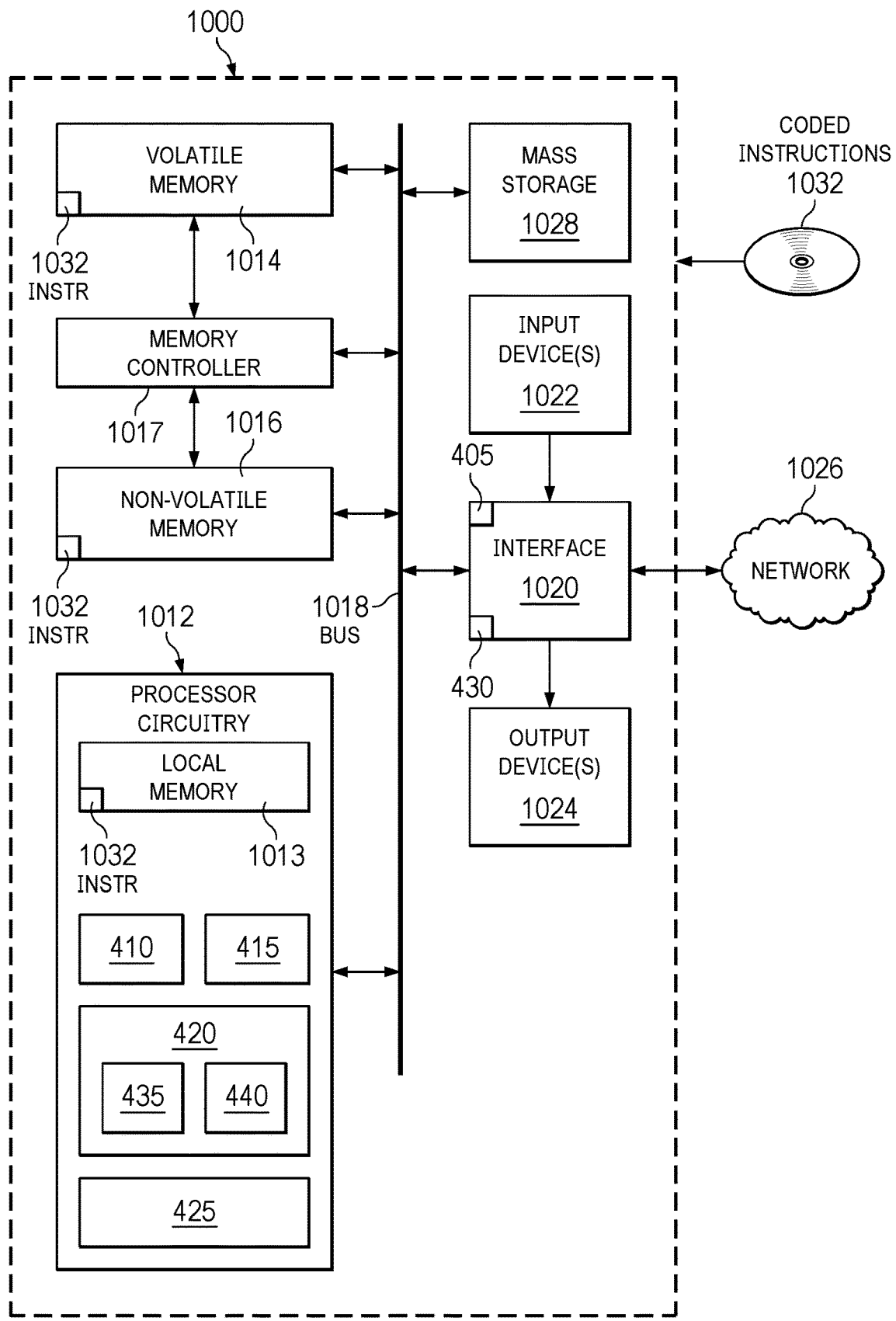
FIG. 10 is a block diagram of an example processing platform including programmable circuitry structured to execute, instantiate, and/or perform the example machine readable instructions and/or perform the example operations of FIGS. 8-9 to implement the state synchronization circuitry 400 of FIG. 4.

FIG. 10 is a block diagram of an example programmable circuitry platform 1000 structured to execute and/or instantiate the example machine-readable instructions and/or the example operations of FIGS. 8-9 to implement the state synchronization circuitry 400 of FIG. 4. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the example transmit circuitry 410, the example receive circuitry 415, the example state machine circuitry 420, the example fault detection circuitry 425, the example FSM 435 and the example LUT 440.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In the illustrated example, the interface circuitry 1020 implements the example synchronization terminal 405 and the example device interface 430.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 8-9, may be stored in the mass storage device 1028, in the volatile memory 1014, in the non-volatile memory 1016, and/or on at least one non-transitory computer readable storage medium such as a CD or DVD which may be removable.

Figure 11:
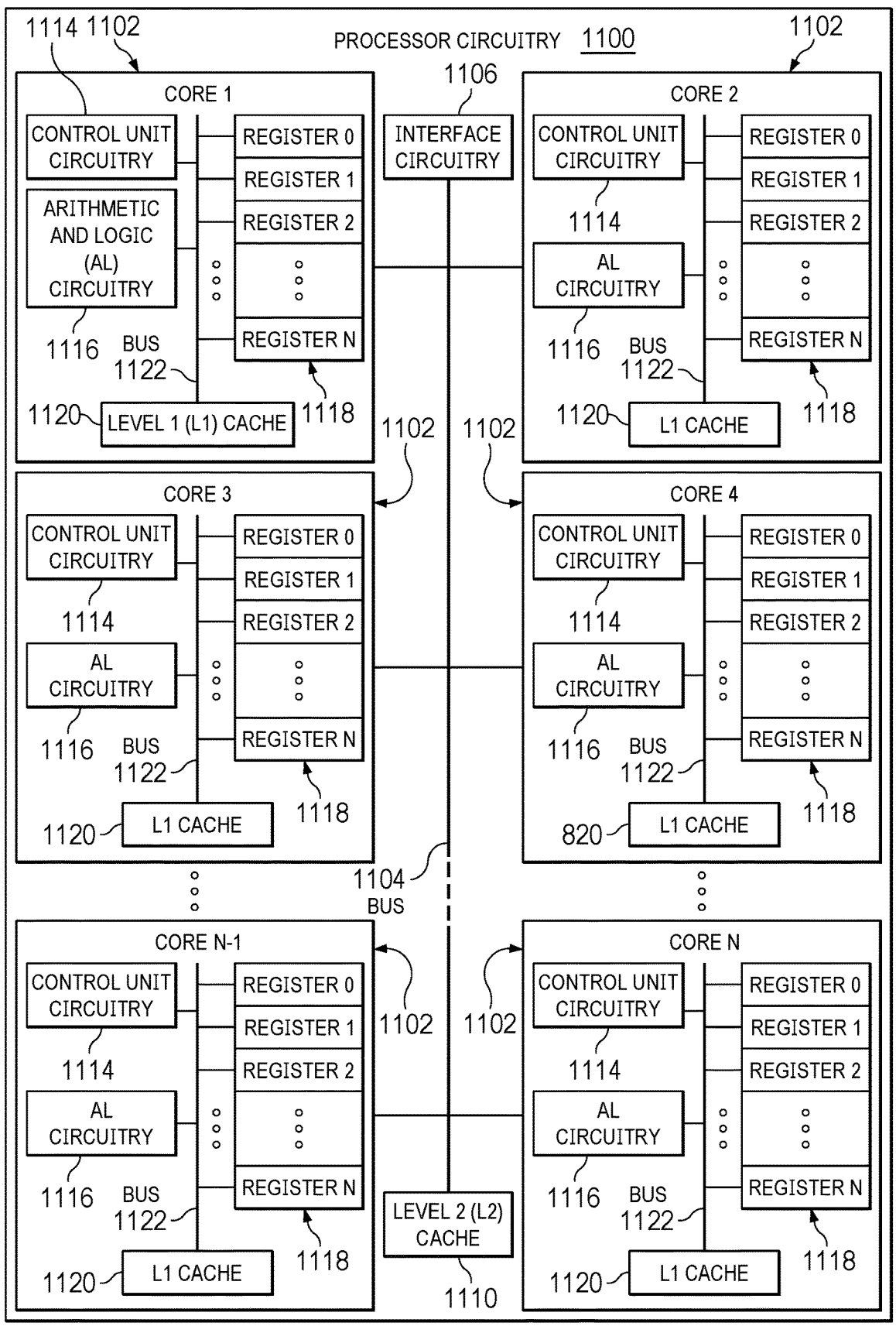
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIGS. 8-9 to effectively instantiate the circuitry of FIG. 4 as logic circuits to perform operations corresponding to those machine readable instructions. In some such examples, the circuitry of FIG. 4 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 8-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
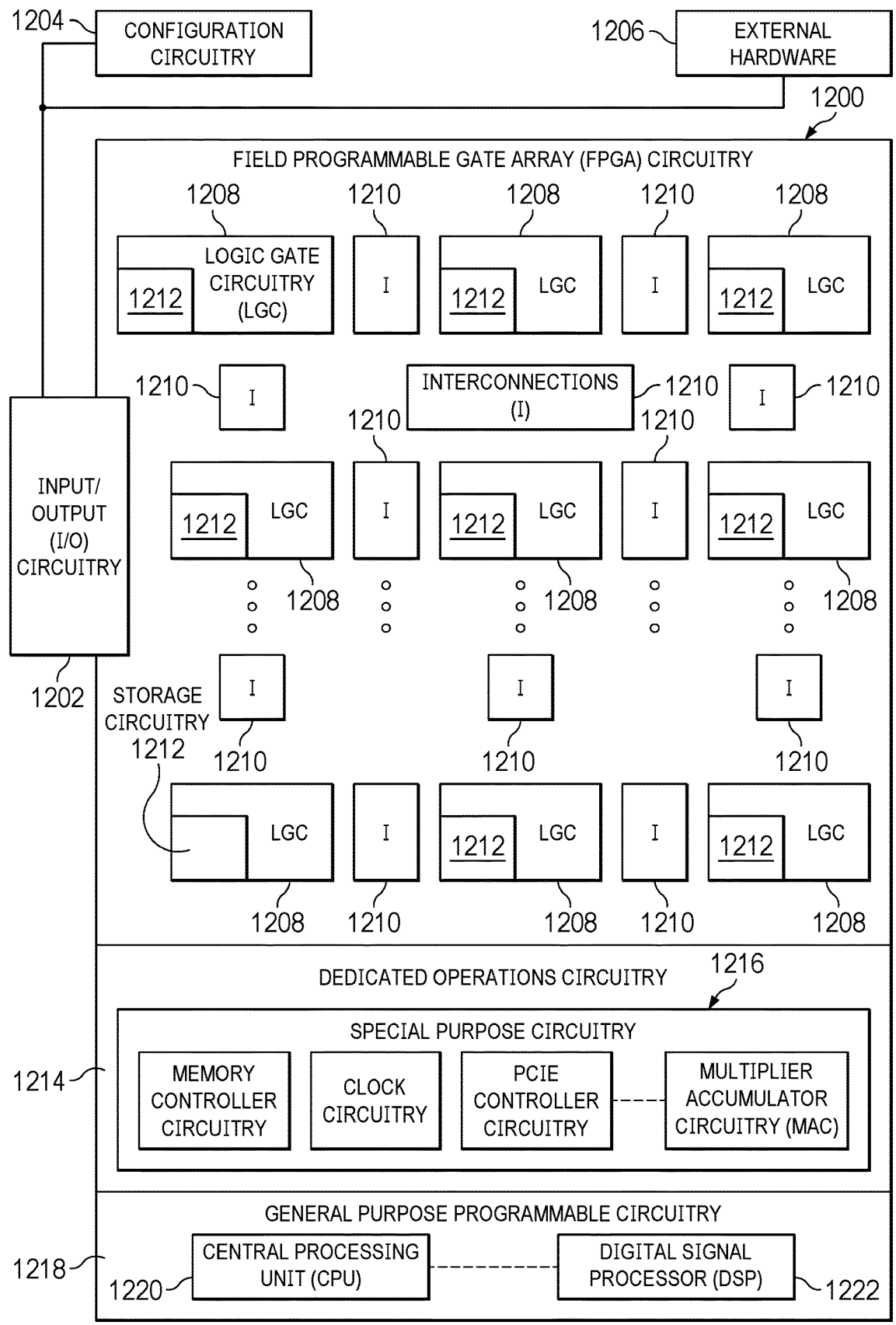
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart(s) of FIGS. 8-9 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 8-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 8-9. As such, the FPGA circuitry 1200 may be configured and/or structured to effectively instantiate some or all of the operations/functions corresponding to the machine readable instructions of the flowchart(s) of FIGS. 8-9 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIGS. 8-9 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIGS. 8-9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart(s) of FIGS. 8-9 to perform first operation(s)/function(s), the FPGA circuitry 1200 of FIG. 12 may be configured and/or structured to perform second operation(s)/function(s) corresponding to a second portion of the machine readable instructions represented by the flowcharts of FIG. 8-9, and/or an ASIC may be configured and/or structured to perform third operation(s)/function(s) corresponding to a third portion of the machine readable instructions represented by the flowcharts of FIGS. 8-9.

It should be understood that some or all of the circuitry of FIG. 4 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 4 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 4 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
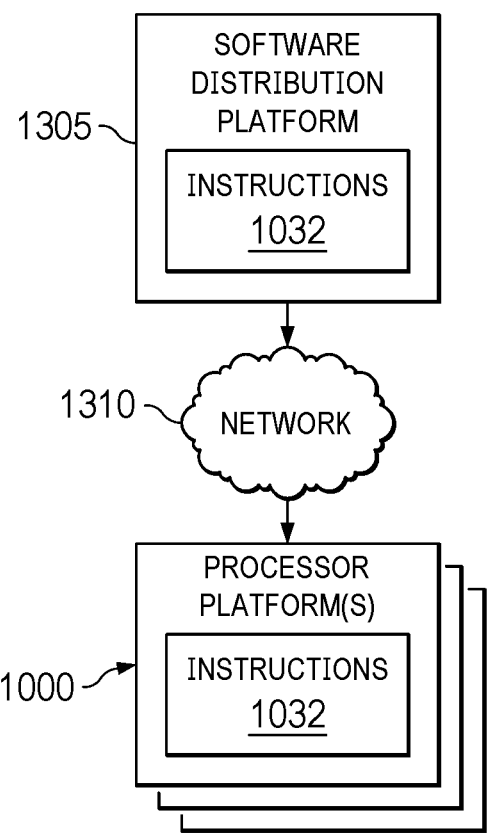
FIG. 13 is a block diagram of an example software/firmware/instructions distribution platform (e.g., one or more servers) to distribute software, instructions, and/or firmware (e.g., corresponding to the example machine readable instructions of FIGS. 8-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to other hardware devices (e.g., hardware devices owned and/or operated by third parties from the owner and/or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 8-9, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIG. 8-9, may be downloaded to the example programmable circuitry platform 1000, which is to execute the machine readable instructions 1032 to implement the state synchronization circuitry 400. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices. Although referred to as software above, the distributed "software" could alternatively be firmware.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts. For example, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAS to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that implement a single-wire interface protocol to synchronize device states between multiple devices. Disclosed systems, apparatus, articles of manufacture, and methods improve the efficiency of using a computing device by implementing a multiple-device PMIC protocol to synchronize multiple PMICs of an overall system in a simple, flexible, and timely manner such that the multiple PMICs behave is if they were a single PMIC. Disclosed systems, apparatus, articles of manufacture, and methods are accordingly directed to one or more improvement(s) in the operation of a machine such as a computer or other electronic and/or mechanical device.

Further examples and combinations of systems, apparatus, articles of manufacture, and methods to implement a single-wire interface protocol to synchronize device states between multiple devices include the following. Example 1 includes a logic circuitry for a first device, the logic circuitry including transmit circuitry configured to pull a terminal of the first device to a first logic value for a first duration corresponding to a first command to be communicated via the terminal, wherein the first duration is one of a plurality of at least three possible durations corresponding respectively to a plurality of possible commands including the first command, and the plurality of possible commands is associated with device operation states synchronized between the first device and a second device coupled to the terminal, and receive circuitry configured to monitor the terminal.

Example 2 includes the logic circuitry of example 1, wherein the plurality of possible commands includes a second command corresponding to a second duration of the plurality of at least three possible durations, the second duration longer than the first duration.

Example 3 includes the logic circuitry of example 2, wherein the second command is associated with a higher priority than the first command.

Example 4 includes the logic circuitry of example 1, wherein the plurality of possible commands corresponds to a first command group of a plurality of possible command groups including the first command group and a second command group, the device operation states are associated with a state machine to be synchronized between the first device and the second device, the first command group is associated with a first state of the state machine, and the second command group is associated with a second state of the state machine.

Example 5 includes the logic circuitry of example 4, wherein the first command is included in the first command group, and the first duration represents both the first command and a second command included in the second command group.

Example 6 includes the logic circuitry of example 1, wherein the transmit circuitry is configured to (i) pull the terminal of the first device to the first logic value at a first time in response to initialization of the first device, and (ii) release the terminal to allow the terminal to float to a second logic value after the initialization of the first device is complete, the receive circuitry is configured to detect a transition of the terminal from the first logic value to the second logic value at a second time after the first time, and the transmit circuitry is configured to pull the terminal to the first logic value for the first duration corresponding to the first command at a third time based on the second time.

Example 7 includes the logic circuitry of example 1, wherein the terminal couples a single wire interface configured to operate between a low voltage and a high voltage, the first logic value corresponds to the low voltage, and the transmit circuitry includes an open-drain driver to pull the terminal of the first device to the low voltage.

Example 8 includes a power management integrated circuit comprising a synchronization terminal to couple to a single wire interface, the single wire interface configured to couple to synchronization terminals of one or more other power management integrated circuits, and operate between a first voltage and a second voltage, state machine circuitry configured to implement a state machine to control transitions among device operation states of the power management integrated circuit, the state machine circuitry including an output configured to specify a first signal duration corresponding to a first command to be signaled on the single wire interface from the power management integrated circuit to the one or more other power management integrated circuits, wherein the first command is associated with the state machine, and an input configured to accept a second signal duration detected on the single wire interface, wherein the state machine circuitry is configured to update the state machine based on a second command corresponding to the second signal duration, transmit circuitry configured to pull the synchronization terminal to the first voltage for the first signal duration specified by the output of the state machine circuitry, and receive circuitry configured to monitor the synchronization terminal to detect the second signal duration, the second signal duration corresponding to a time interval over which the single wire interface is pulled to the first voltage, and provide the second signal duration to the input of the state machine circuitry.

Example 9 includes the power management integrated circuit of example 8, wherein the state machine circuitry is configured to implement a lookup table to convert the first command to the first signal duration, and convert the second signal duration to the second command.

Example 10 includes the power management integrated circuit of example 8, wherein the state machine circuitry is configured to select the first command from a plurality of commands associated with the state machine, wherein the plurality of commands include the first command and the second command, the plurality of commands correspond respectively to a plurality of signal durations, and the plurality of signal durations include the first signal duration and the second signal duration.

Example 11 includes the power management integrated circuit of example 10, wherein the plurality of commands includes a heartbeat command to be signaled on the single wire interface repeatedly based on a repetition periodic, the heartbeat command corresponding to a shortest one of the plurality of signal durations.

Example 12 includes the power management integrated circuit of example 11, wherein the first command specifies a requested state transition of the state machine, and the state machine circuitry is configured to set the output to specify the shortest one of the plurality of signal durations corresponding to the heartbeat command by default, and set the output to correspond to the first signal duration corresponding to the first command in response to a trigger associated with the requested state transition.

Example 13 includes the power management integrated circuit of example 10, wherein the plurality of commands corresponds to a first command set of a plurality of command sets, and the state machine circuitry is to select the first command set based on a present state of the state machine.

Example 14 includes the power management integrated circuit of example 13, wherein a same signal duration is reused to represent one command in the first command set and another command in a second command set of the plurality of command sets.

Example 15 includes the power management integrated circuit of example 8, wherein the state machine circuitry is configured to cause the transmit circuitry to (i) pull the synchronization terminal to the first voltage at a first time in response to initialization of the power management integrated circuit, and (ii) release the synchronization terminal to allow the synchronization terminal to float to the second voltage after the initialization of the power management integrated circuit is complete, and synchronize operation of the transmit circuitry and receive circuitry based on a second time at which the receive circuitry detects a transition of the synchronization terminal from the first voltage to the second voltage, the second time after the first time.

Example 16 includes a non-transitory computer readable medium comprising computer readable instructions to cause a programmable device that is to couple to a single wire interface to at least pull the single wire interface to a low voltage for a first signal duration to communicate a first command to one or more other devices to be coupled to the single wire interface, the single wire interface to operate between the low voltage and a high voltage, the first signal duration to begin at a first time, the first signal duration to be one of a plurality of at least three possible signal durations corresponding respectively to a plurality of possible commands including the first command, the plurality of possible commands associated with a state machine to be synchronized between the programmable device and the one or more other devices, detect a second signal duration on the single wire interface, the second signal duration corresponding to a time interval over which the single wire interface is pulled to the low voltage, the second signal duration to begin at a second time, and update the state machine based on a second command corresponding to the second signal duration.

Example 17 includes the non-transitory computer readable medium of example 16, wherein the first command corresponds to a heartbeat command, the first signal duration corresponds to a shortest one of the plurality of at least three possible signal durations, and the instructions are configured to cause the programmable device to pull the single wire interface to the low voltage for the first signal duration repeatedly based on a repetition period to communicate the heartbeat command on the single wire interface.

Example 18 includes the non-transitory computer readable medium of example 16, wherein the instructions are configured to cause the programmable device to pull the single wire interface to the low voltage during initialization of the programmable device, release the single wire interface to allow the single wire interface to float to the high voltage after the initialization of the programmable device is complete, detect a transition of the single wire interface from the low voltage to the high voltage after the initialization of the programmable device is complete, and synchronize subsequent communication via the single wire interface based on detection of the transition of the single wire interface from the low voltage to the high voltage.

Example 19 includes the non-transitory computer readable medium of example 16, wherein the plurality of possible commands corresponds to a first command group of a plurality of command groups including the first command group and a second command group, and at least one command of the first command group and at least one command of the second command group are to be represented by a same signal duration.

Example 20 includes the non-transitory computer readable medium of example 16, wherein the second signal duration is longer than the first signal duration, and the second command has a higher priority than the first command.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A logic circuitry for a first device, the logic circuitry including:
   transmit circuitry configured to pull a terminal of the first device to a first logic value for a first duration corresponding to a first command to be communicated via the terminal, wherein:
      the first duration is one of a plurality of at least three possible durations corresponding respectively to a plurality of possible commands including the first command; and
      the plurality of possible commands is associated with device operation states synchronized between the first device and a second device coupled to the terminal; and
   receive circuitry configured to monitor the terminal.

2. The logic circuitry of claim 1, wherein the plurality of possible commands includes a second command corresponding to a second duration of the plurality of at least three possible durations, the second duration longer than the first duration.

3. The logic circuitry of claim 2, wherein the second command is associated with a higher priority than the first command.

4. The logic circuitry of claim 1, wherein the plurality of possible commands corresponds to a first command group of a plurality of possible command groups including the first command group and a second command group, the device operation states are associated with a state machine to be synchronized between the first device and the second device, the first command group is associated with a first state of the state machine, and the second command group is associated with a second state of the state machine.

5. The logic circuitry of claim 4, wherein the first command is included in the first command group, and the first duration represents both the first command and a second command included in the second command group.

6. The logic circuitry of claim 1, wherein:
   the transmit circuitry is configured to:
      (i) pull the terminal of the first device to the first logic value at a first time in response to initialization of the first device, and
      (ii) release the terminal to allow the terminal to float to a second logic value after the initialization of the first device is complete;
   the receive circuitry is configured to detect a transition of the terminal from the first logic value to the second logic value at a second time after the first time; and
   the transmit circuitry is configured to pull the terminal to the first logic value for the first duration corresponding to the first command at a third time based on the second time.

7. The logic circuitry of claim 1, wherein the terminal couples a single wire interface configured to operate between a low voltage and a high voltage, the first logic value corresponds to the low voltage, and the transmit circuitry includes an open-drain driver to pull the terminal of the first device to the low voltage.

8. A power management integrated circuit comprising:
a synchronization terminal to couple to a single wire interface, the single wire interface configured to:
couple to synchronization terminals of one or more other power management integrated circuits; and
operate between a first voltage and a second voltage;
state machine circuitry configured to implement a state machine to control transitions among device operation states of the power management integrated circuit, the state machine circuitry including:
an output configured to specify a first signal duration corresponding to a first command to be signaled on the single wire interface from the power management integrated circuit to the one or more other power management integrated circuits, wherein the first command is associated with the state machine; and
an input configured to accept a second signal duration detected on the single wire interface, wherein the state machine circuitry is configured to update the state machine based on a second command corresponding to the second signal duration;
transmit circuitry configured to pull the synchronization terminal to the first voltage for the first signal duration specified by the output of the state machine circuitry; and
receive circuitry configured to:
monitor the synchronization terminal to detect the second signal duration, the second signal duration corresponding to a time interval over which the single wire interface is pulled to the first voltage; and
provide the second signal duration to the input of the state machine circuitry.

9. The power management integrated circuit of claim 8, wherein the state machine circuitry is configured to implement a lookup table to:
convert the first command to the first signal duration; and
convert the second signal duration to the second command.

10. The power management integrated circuit of claim 8, wherein the state machine circuitry is configured to select the first command from a plurality of commands associated with the state machine, wherein:
the plurality of commands include the first command and the second command,
the plurality of commands correspond respectively to a plurality of signal durations, and
the plurality of signal durations include the first signal duration and the second signal duration.

11. The power management integrated circuit of claim 10, wherein the plurality of commands includes a heartbeat command to be signaled on the single wire interface repeatedly based on a repetition periodic, the heartbeat command corresponding to a shortest one of the plurality of signal durations.

12. The power management integrated circuit of claim 11, wherein the first command specifies a requested state transition of the state machine, and the state machine circuitry is configured to:
set the output to specify the shortest one of the plurality of signal durations corresponding to the heartbeat command by default; and
set the output to correspond to the first signal duration corresponding to the first command in response to a trigger associated with the requested state transition.

13. The power management integrated circuit of claim 10, wherein the plurality of commands corresponds to a first command set of a plurality of command sets, and the state machine circuitry is to select the first command set based on a present state of the state machine.

14. The power management integrated circuit of claim 13, wherein a same signal duration is reused to represent one command in the first command set and another command in a second command set of the plurality of command sets.

15. The power management integrated circuit of claim 8, wherein the state machine circuitry is configured to:
cause the transmit circuitry to:
(i) pull the synchronization terminal to the first voltage at a first time in response to initialization of the power management integrated circuit, and
(ii) release the synchronization terminal to allow the synchronization terminal to float to the second voltage after the initialization of the power management integrated circuit is complete; and
synchronize operation of the transmit circuitry and receive circuitry based on a second time at which the receive circuitry detects a transition of the synchronization terminal from the first voltage to the second voltage, the second time after the first time.

16. A non-transitory computer readable medium comprising computer readable instructions to cause a programmable device that is to couple to a single wire interface to at least:
pull the single wire interface to a low voltage for a first signal duration to communicate a first command to one or more other devices to be coupled to the single wire interface, the single wire interface to operate between the low voltage and a high voltage, the first signal duration to begin at a first time, the first signal duration to be one of a plurality of at least three possible signal durations corresponding respectively to a plurality of possible commands including the first command, the plurality of possible commands associated with a state machine to be synchronized between the programmable device and the one or more other devices;
detect a second signal duration on the single wire interface, the second signal duration corresponding to a time interval over which the single wire interface is pulled to the low voltage, the second signal duration to begin at a second time; and
update the state machine based on a second command corresponding to the second signal duration.

17. The non-transitory computer readable medium of claim 16, wherein the first command corresponds to a heartbeat command, the first signal duration corresponds to a shortest one of the plurality of at least three possible signal durations, and the instructions are configured to cause the programmable device to pull the single wire interface to the low voltage for the first signal duration repeatedly based on a repetition period to communicate the heartbeat command on the single wire interface.

18. The non-transitory computer readable medium of claim 16, wherein the instructions are configured to cause the programmable device to:
pull the single wire interface to the low voltage during initialization of the programmable device;
release the single wire interface to allow the single wire interface to float to the high voltage after the initialization of the programmable device is complete;

detect a transition of the single wire interface from the low voltage to the high voltage after the initialization of the programmable device is complete; and synchronize subsequent communication via the single wire interface based on detection of the transition of the single wire interface from the low voltage to the high voltage.

19. The non-transitory computer readable medium of claim 16, wherein the plurality of possible commands corresponds to a first command group of a plurality of command groups including the first command group and a second command group, and at least one command of the first command group and at least one command of the second command group are to be represented by a same signal duration.

20. The non-transitory computer readable medium of claim 16, wherein the second signal duration is longer than the first signal duration, and the second command has a higher priority than the first command.

* * * * *